United States Patent [19]
Hotelling et al.

[11] Patent Number: 5,698,784
[45] Date of Patent: Dec. 16, 1997

[54] VIBRATORY RATE GYROSCOPE AND METHODS OF ASSEMBLY AND OPERATION

[75] Inventors: Steven P. Hotelling, Cupertino; Brian R. Land, Los Gatos, both of Calif.

[73] Assignee: Gyration, Inc., Saratoga, Calif.

[21] Appl. No.: 593,534

[22] Filed: Jan. 24, 1996

[51] Int. Cl.$^6$ .............................. G01C 19/00; G01P 9/00
[52] U.S. Cl. .............................................................. 73/504.16
[58] Field of Search .......................... 73/504.16, 504.15, 73/504.12, 504.04, 504.02

[56] References Cited

U.S. PATENT DOCUMENTS

| | | | |
|---|---|---|---|
| Re. 22,409 | 12/1943 | Lyman et al. | 33/204 |
| 2,455,939 | 12/1948 | Meredith | 73/504.16 |
| 2,514,250 | 7/1950 | Meredith | 264/1 |
| 2,542,018 | 2/1951 | Ferrill, Jr. et al. | 33/204 |
| 2,683,596 | 7/1954 | Morrow et al. | 73/504.16 |
| 2,753,173 | 7/1956 | Barnaby et al. | 73/504.16 |
| 3,302,465 | 2/1967 | Mathey | 73/505 |
| 3,680,392 | 8/1972 | Hoffman et al. | 73/516 R |
| 3,839,915 | 10/1974 | Schlitt | 73/504.16 |
| 3,913,405 | 10/1975 | Ljung et al. | 73/505 |
| 3,992,952 | 11/1976 | Hutton et al. | 73/505 |
| 4,267,731 | 5/1981 | Jacobson | 73/505 |
| 4,361,054 | 11/1982 | Bailey | 74/5.6 D |
| 4,489,609 | 12/1984 | Burdess et al. | 73/505 |
| 4,644,793 | 2/1987 | Church | 73/505 |
| 4,674,331 | 6/1987 | Watson | 73/504.16 |
| 4,694,696 | 9/1987 | Hojo et al. | 73/497 |
| 4,759,220 | 7/1988 | Burdess et al. | 73/505 |
| 4,836,023 | 6/1989 | Oikawa | 73/505 |
| 5,014,554 | 5/1991 | Terada et al. | 73/505 |
| 5,097,707 | 3/1992 | Church | 73/505 |
| 5,117,148 | 5/1992 | Nakamura et al. | 310/367 |
| 5,131,273 | 7/1992 | Tabata et al. | 73/505 |
| 5,189,913 | 3/1993 | Netzer et al. | 73/504.08 |
| 5,193,391 | 3/1993 | Cage | 73/504.15 |
| 5,212,985 | 5/1993 | Takenaka et al. | 73/505 |
| 5,220,833 | 6/1993 | Nakamura | 73/505 |
| 5,293,779 | 3/1994 | Nakamura et al. | 73/505 |
| 5,336,960 | 8/1994 | Shimizu et al. | 310/369 |
| 5,345,822 | 9/1994 | Nakamura et al. | 73/505 |
| 5,349,261 | 9/1994 | Fujimoto et al. | 310/321 |
| 5,349,856 | 9/1994 | Nakamura | 73/505 |
| 5,349,857 | 9/1994 | Kasanami et al. | 73/505 |
| 5,355,034 | 10/1994 | Nakamura et al. | 307/491 |
| 5,412,204 | 5/1995 | Nakamura | 250/231.12 |
| 5,414,320 | 5/1995 | Mashio | 310/311 |
| 5,434,365 | 7/1995 | Mori et al. | 174/262 |
| 5,445,025 | 8/1995 | Terada et al. | 73/504.15 |
| 5,447,066 | 9/1995 | Terada et al. | 73/504.16 |

FOREIGN PATENT DOCUMENTS

| | | | |
|---|---|---|---|
| 403113310A | 5/1991 | Japan | 73/504.16 |
| 403113311A | 5/1991 | Japan | 73/504.16 |
| 861436 | 2/1961 | United Kingdom | 73/504.16 |

*Primary Examiner*—Hezron E. Williams
*Assistant Examiner*—Richard A. Moller
*Attorney, Agent, or Firm*—Albert C. Smith; Fenwick & West LLP

[57] ABSTRACT

A vibrating gyroscope employs an electromagnetic transducer assembly which excites the vibration of the inertial element and senses its trajectory to provide an indication of movement relative to the plane of vibration of the inertial element. The transducer assembly allows for calibration of the gyroscope by positioning the transducer relative to the inertial element, thereby eliminating conventional requirements for selectively removing material from the inertial element during final calibration. Elastic members of the inertial element are manufactured in a monolithic structure to enhance the vibratory symmetry of the inertial element and the consistency and repeatability of its resonant properties. A phase-shifting circuit allows accurate extraction of rate information from the transducer while rejecting error signals. A mounting system facilitates mounting inertial elements to provide a simple implementations of multi-axis vibrating gyroscopes.

6 Claims, 18 Drawing Sheets

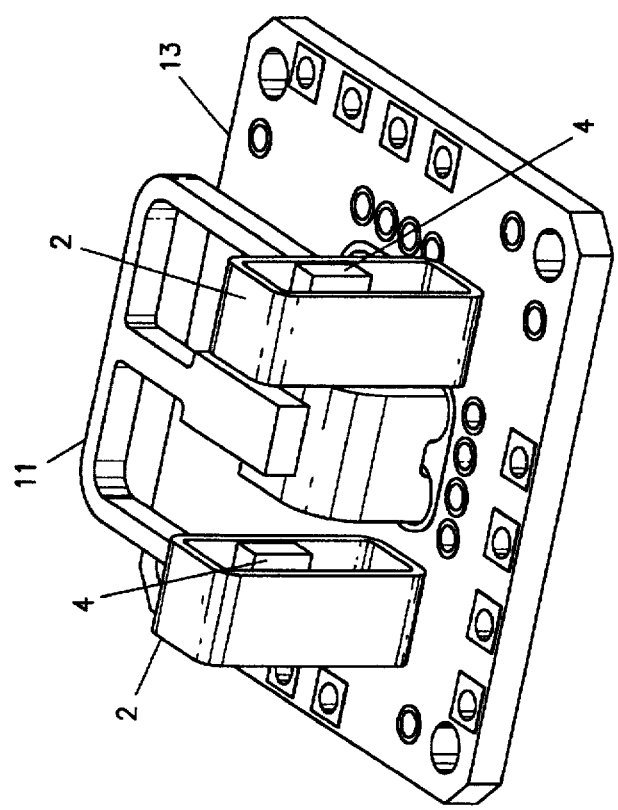
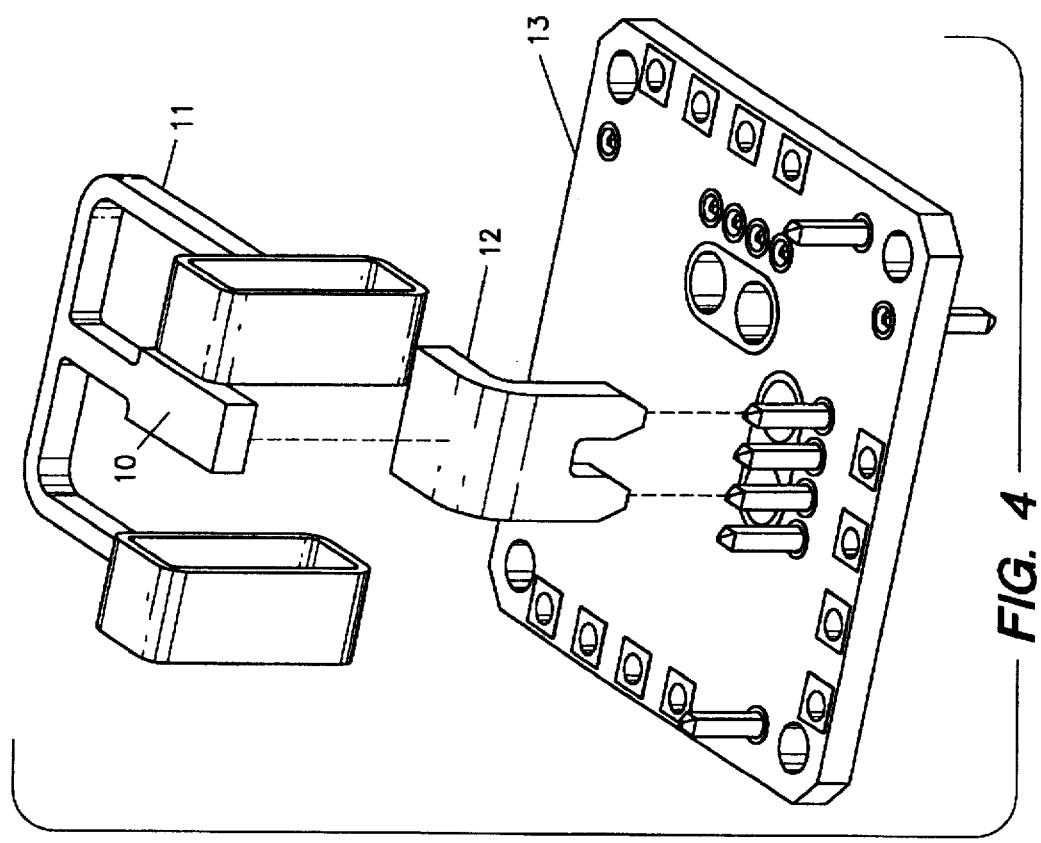

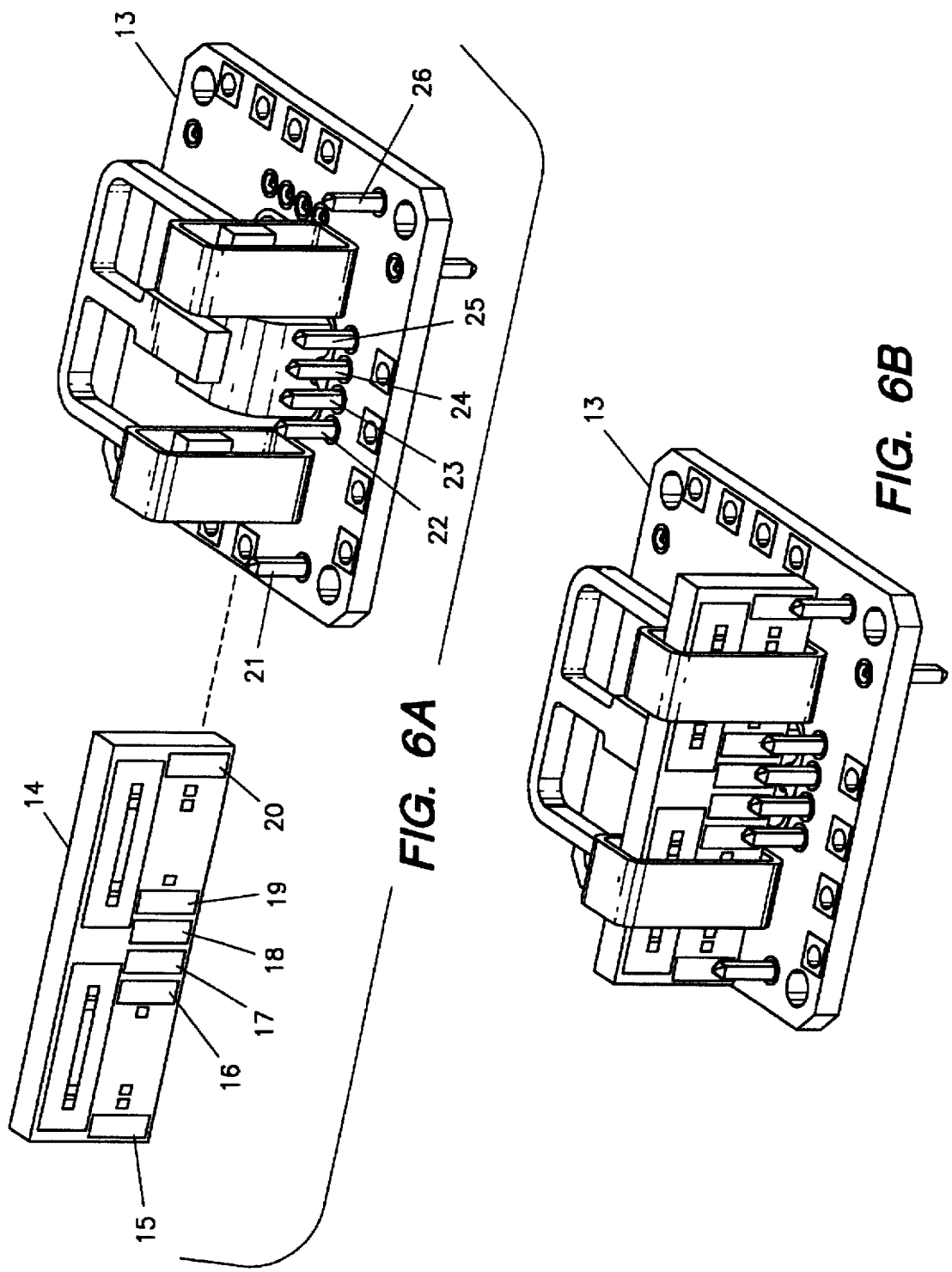

FIG. 8A
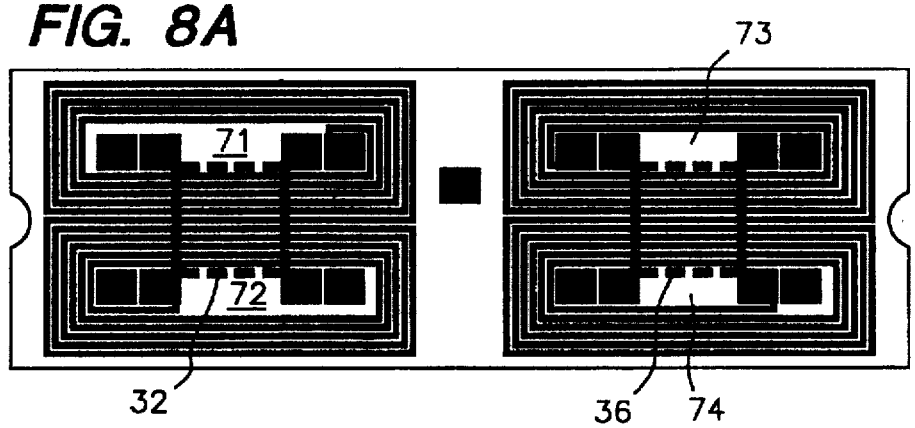
FIG. 8B
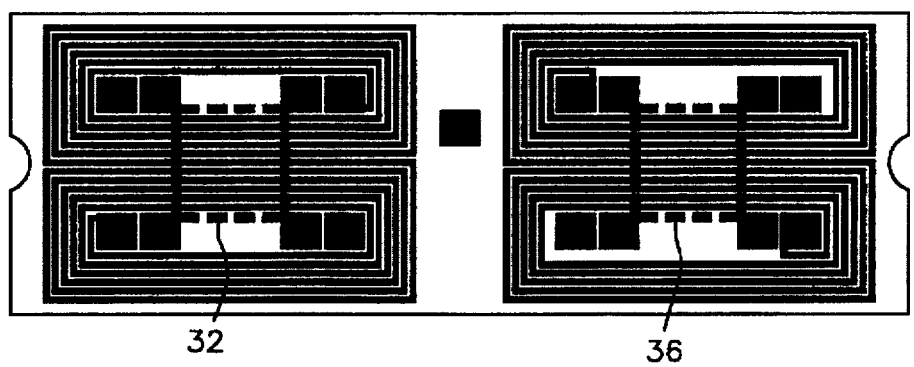
FIG. 8C
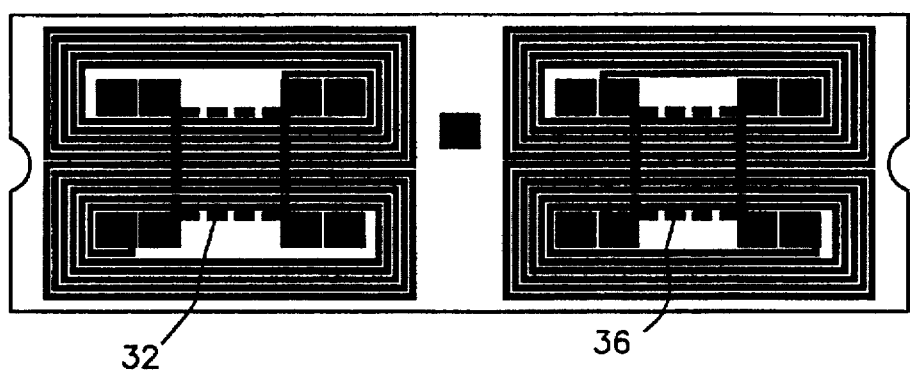
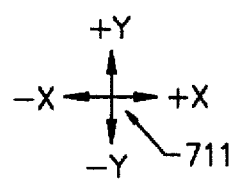
FIG. 9

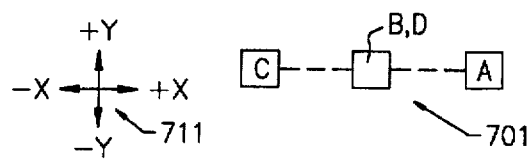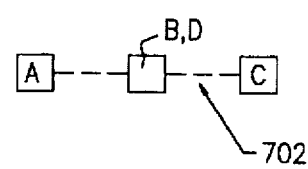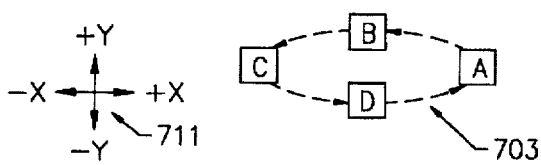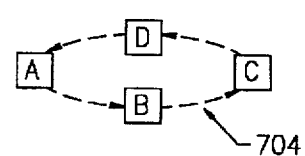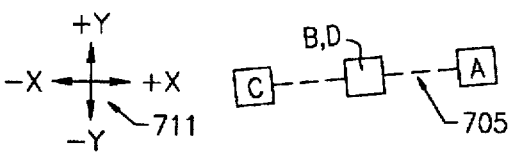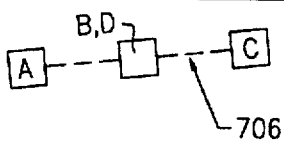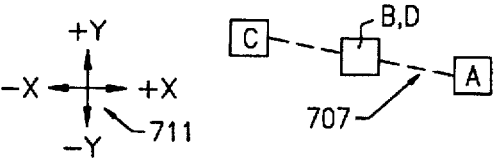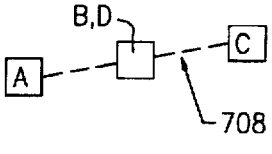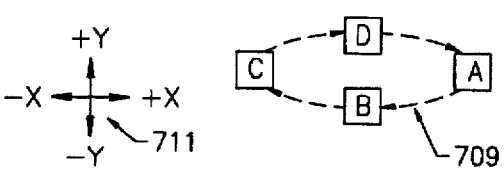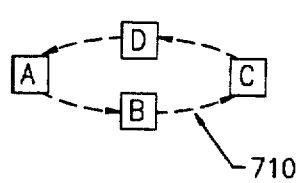

FIG. 14A
STATIC, ALIGNED
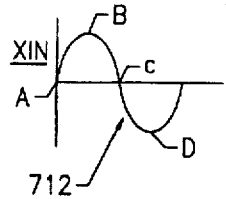
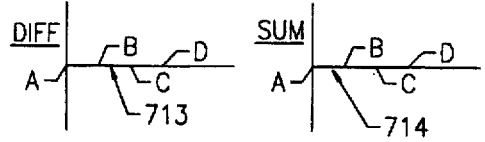
| SIGNAL | DIFF_90 | DIFF_0 | SUM_90 | SUM_0 |
|---|---|---|---|---|
| VALUE | 0 | 0 | 0 | 0 |
FIG. 14B
DIFFERENTIAL ORBITAL
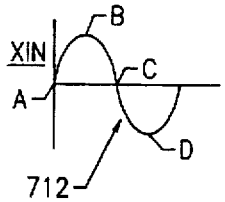
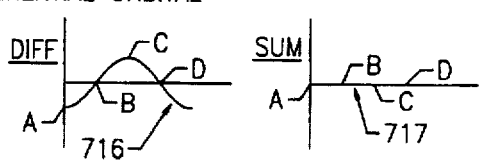
| SIGNAL | DIFF_90 | DIFF_0 | SUM_90 | SUM_0 |
|---|---|---|---|---|
| VALUE | + | 0 | 0 | 0 |
FIG. 14C
DIFFERENTIAL DIAGONAL
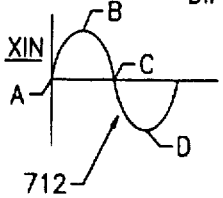
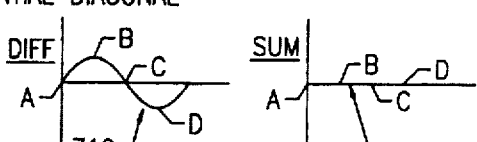
| SIGNAL | DIFF_90 | DIFF_0 | SUM_90 | SUM_0 |
|---|---|---|---|---|
| VALUE | 0 | + | 0 | 0 |
FIG. 14D
COMMON MODE DIAGONAL
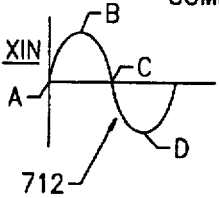
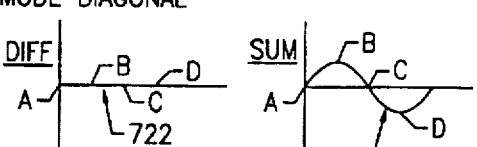
| SIGNAL | DIFF_90 | DIFF_0 | SUM_90 | SUM_0 |
|---|---|---|---|---|
| VALUE | 0 | 0 | 0 | + |
FIG. 14E
COMMON MODE ORBITAL
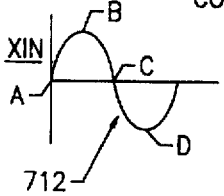
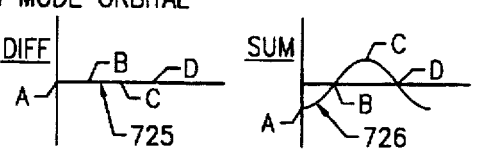
| SIGNAL | DIFF_90 | DIFF_0 | SUM_90 | SUM_0 |
|---|---|---|---|---|
| VALUE | 0 | 0 | + | 0 |

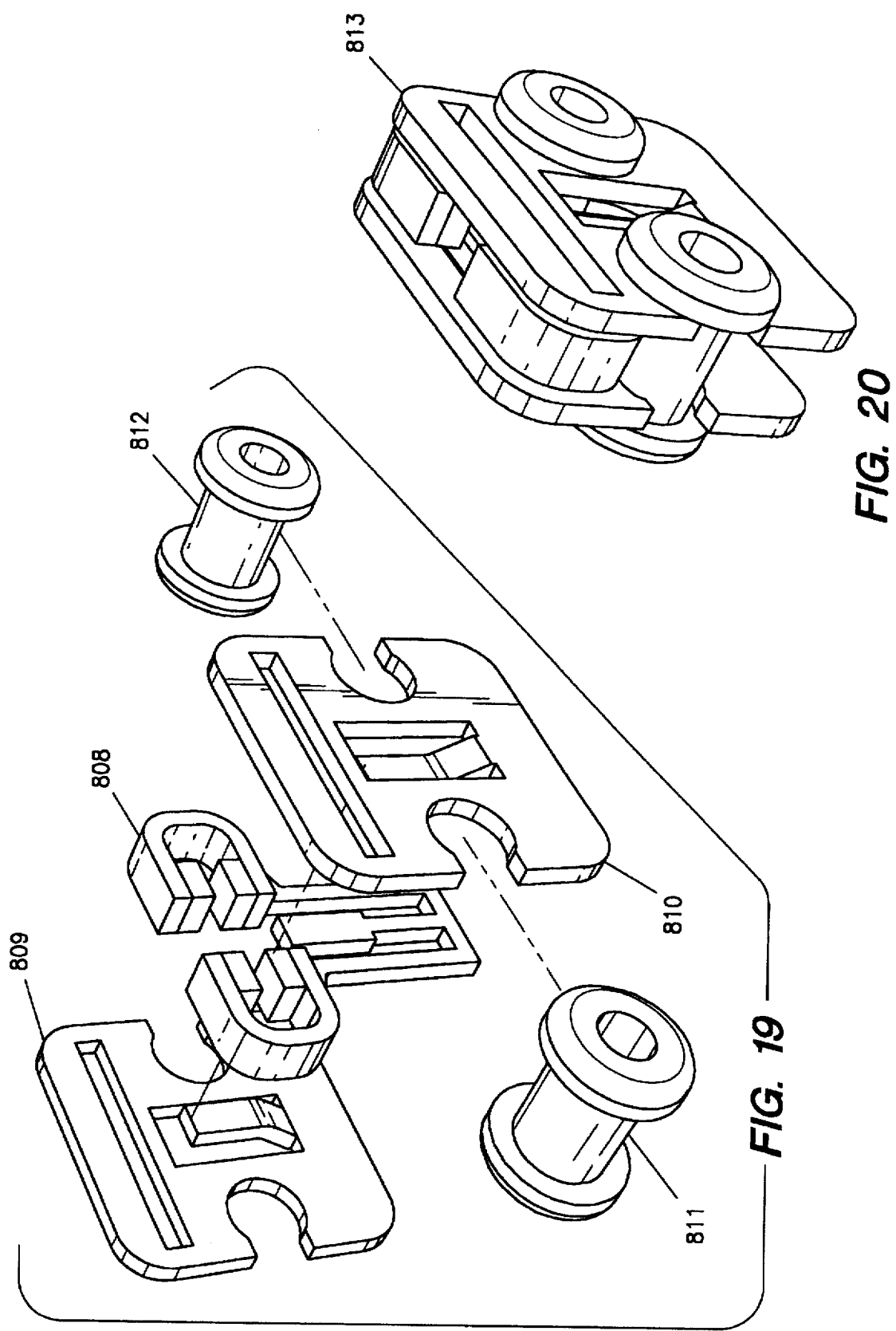

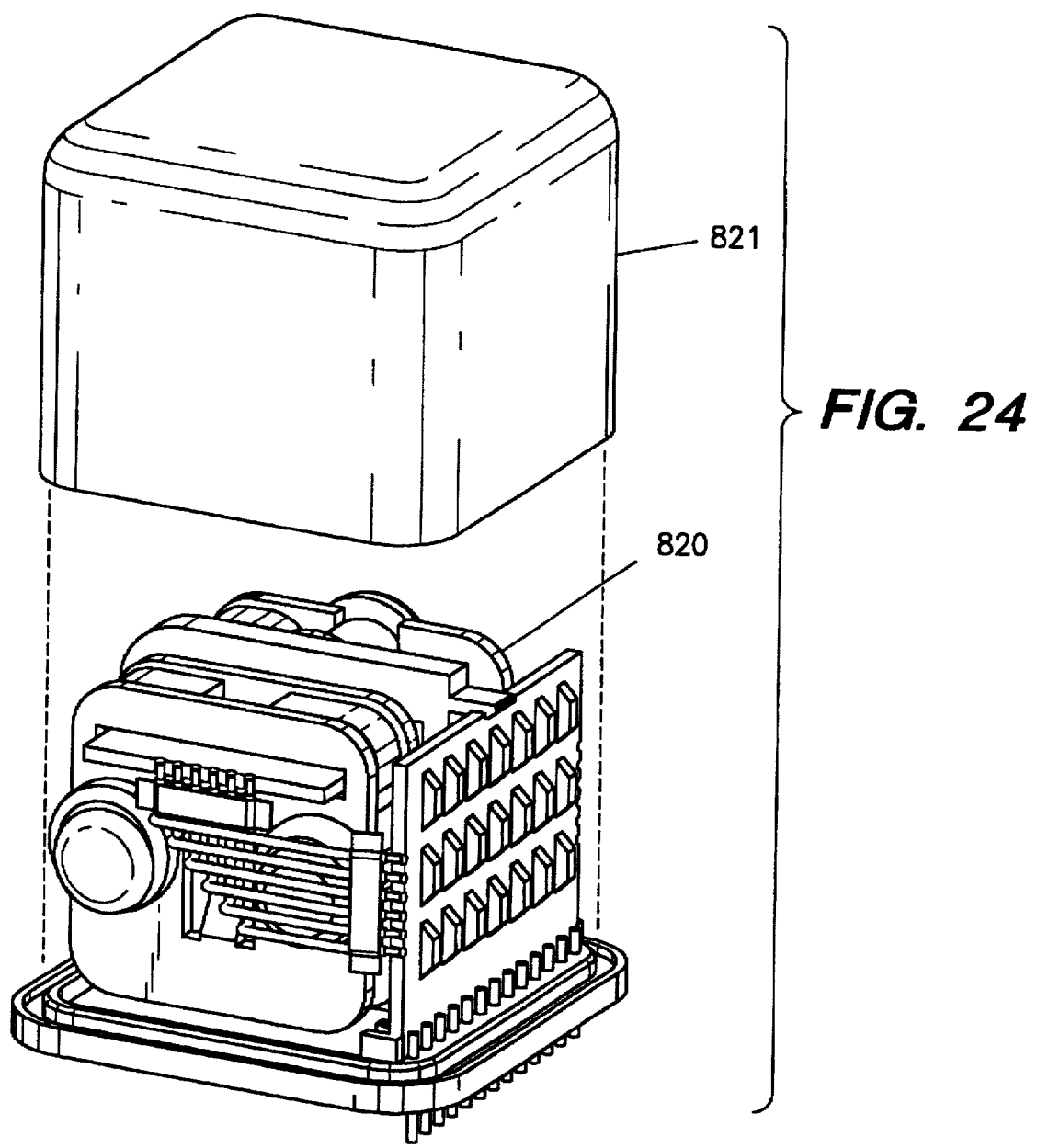

VIBRATORY RATE GYROSCOPE AND METHODS OF ASSEMBLY AND OPERATION

FIELD OF THE INVENTION

This invention relates to vibrating gyroscopes, and more particularly to such a gyroscope configured with substantial symmetry of components to facilitate convenient fabrication and calibration with transducers positioned in non-contacting relationship to inertial elements.

BACKGROUND OF THE INVENTION

Certain known vibrating gyroscopes rely upon magnetic or piezoelectric vibrators to establish an inertial axis of angular momentum about which relative angular displacements or angular rates can be sensed. U.S. Pat. No. 2,309,853 describes a vibrating gyroscope in which vibrations are magnetically sensed. A tuning fork structure is described that appears to function as an angular position gyroscope since the tuning fork is suspended in a ball bearing spindle so that the tuning fork remains fixed in inertial space while the angular position, not the angular rate, of the fork is sensed.

U.S. Pat. No. 4,802,364 discloses a tuning-fork vibrating gyroscope which incorporates magnet/coil sensing. The geometry of the tynes reduces the coupling between the tynes and the mounting structure. There appear to be no metal return paths for the magnets due to the geometry of the tuning fork, so the magnets are operated "open loop". Coils are attached to the tynes of the tuning fork, and associated wiring must be routed from the moving tynes to the fixed base. Such wiring disturbs the vibrating symmetry, and the requisite insulation damps the desired vibrations, requiring increased oscillation drive current for a given vibration amplitude. Also, a magnetic shield must be implemented to inhibit interaction with environmental magnetic fields. Such a magnetic shield on an open-loop magnetic structure must be distant from the magnets to prevent undesirable eddy-current damping and unwanted magnetic interactions. Such a distant shield suggests a large overall package dimension.

U.S. Pat. No. 4,671,112 discloses a tuning-fork gyroscope that uses 4 discrete piezo transducers to excite and sense the vibration. Each tuning fork includes 2 transducers. On one tyne, there are the drive transducer and the first of 2 sense transducers, and on the other tyne, there are the drive amplitude feedback transducer and the second of 2 sense transducers. The two tynes are joined by a mechanical coupling member, and an elastic member supports the coupling member relative to the base of the device. Because 4 discrete piezo transducers are used, the mechanical to electrical conversion efficiency of the 4 transducers can change differently over time and temperature, causing errors in the output of the sensor. The piezo transducers are mechanically joined to the moving-beam elements, and it is therefore necessary to provide flexible wiring to the transducers which can damp and alter resonant symmetry of the vibration. Also, the principle axes of elasticity of the tynes as originally manufactured generally will not coincide with the orientation of the drive and sense transducers, so material removal is typically used to align the principle axes of elasticity to the orientation of the piezo transducers.

U.S. Pat. No. 5,193,391 discloses a vibrating angular rate gyroscope that includes magnets attached to the tynes of a tuning-fork vibrating inertial element, and includes drive/sense coils formed on printed circuit boards. Drive and sense functions are accomplished by magnet to magnet proximity. Specifically, the closer the magnets are to each other, the more flux flows, which causes increased emf in the coils. The geometry of the tynes reduces the coupling between the tynes and the mounting structure. And, eddy current damping in the magnets and the magnetic return path reduce the quality factor, or Q, of the resonant vibration, thus requiring additional drive power to sustain a desired vibration amplitude.

SUMMARY OF THE INVENTION

The vibrating gyroscope of the present invention includes an inverted or folded fork-like vibrating inertial element with non-contacting electromagnetic transducers arranged to excite the vibration of the inertial element and sense its trajectory to provide an indication of turn rate. The inertial element includes elastic members that are manufactured in a monolithic structure to enhance the consistency of symmetry and resonant properties of the inertial element.

Closed loop magnetic structures are attached to and are carried by the inertial element to avoid magnetic interaction with surrounding environment and/or adjacent shields, and to avoid eddy current damping. Drive and sense coils are formed through photolithography to provide accurate registration between the drive and sense coils in highly repeatable configuration for inexpensive mass production. Alternatively, coils may be wire-wound.

The magnetic drive and sense structure includes magnets and magnetic return paths for the magnets that are mounted in symmetrical array on the vibrating inertial element. The drive and sense coils are fixed in circuit board configurations attached to the supporting structure in non-contacting orientation relative to the vibrating tynes. With constant magnetic flux in the magnets and return paths, there is no eddy current damping in these elements.

The elastic part of the tuning fork is formed, for example, in a single stamping operation from a single sheet of material for a high degree of symmetry and repeatability of the tuning fork tynes as manufactured. A single coil assembly is produced by photolithography on circuit boards to accomplish all 4 functions of oscillation drive, drive feedback, and sense for each vibrating tyne. The magnetic fields set up by the magnets attached to the ends of the tynes interact with the coil assembly to produce a stable mechanical structure that provides good magnetic to electrical conversion efficiency that remains stable with time and temperature. Also, because the transducers are not attached to the tynes, there is no need for flexible wiring on the moving tyne elements. Also, the coil assembly can be oriented relative to the tuning fork tynes during fabrication in order to select and then fix the alignment of the principle transducer directions with the principle axes of elasticity for the tuning fork tynes. In this structure according to the present invention the flux flowing in the magnetic loops remains constant, and the change in the position, not quantity, of the magnet flux is measured by the coils which remain stationary. With the magnetic flux in each magnet and return path constant, eddy current damping is eliminated. Multiple similar structures may be assembled together with the inertial axis of each structure orthogonally oriented to the inertial axis of each other structure to provide a multiple-axis rate gyroscope.

BRIEF DESCRIPTION OF THE DRAWINGS

FIG. 4 is an exploded perspective view of the inertial element of FIG. 1 mounted on a supporting element and base;

FIG. 5 is a perspective view of the inertial element mounted on the base;

FIGS. 6A and 6B are, respectively, exploded and assembled perspective views of the gyroscope according to one embodiment of the present invention;

FIGS. 7A, 7B, 7C, 7D and 8A, 8B, 8C are plane views of printed circuits for assembly with the inertial element as illustrated in FIGS. 6A and 6B;

FIG. 9 is blank;

FIGS. 13A, B, C, and D–E are pictorial illustrations of time-sequenced trajectories associated with the vibrational motion of the gyroscopic element according to the present invention;

FIGS. 14A–14E are graphs illustrating operational waveforms and signal values at selected circuit nodes;

FIG. 19 is an exploded perspective view of the mounting assembly of the embodiment of FIG. 18;

FIG. 20 a perspective view of the embodiment of FIG. 19;

FIG. 24 is an exploded perspective view of the embodiment of FIG. 23.

DESCRIPTION OF THE PREFERRED EMBODIMENT

Figure 1:
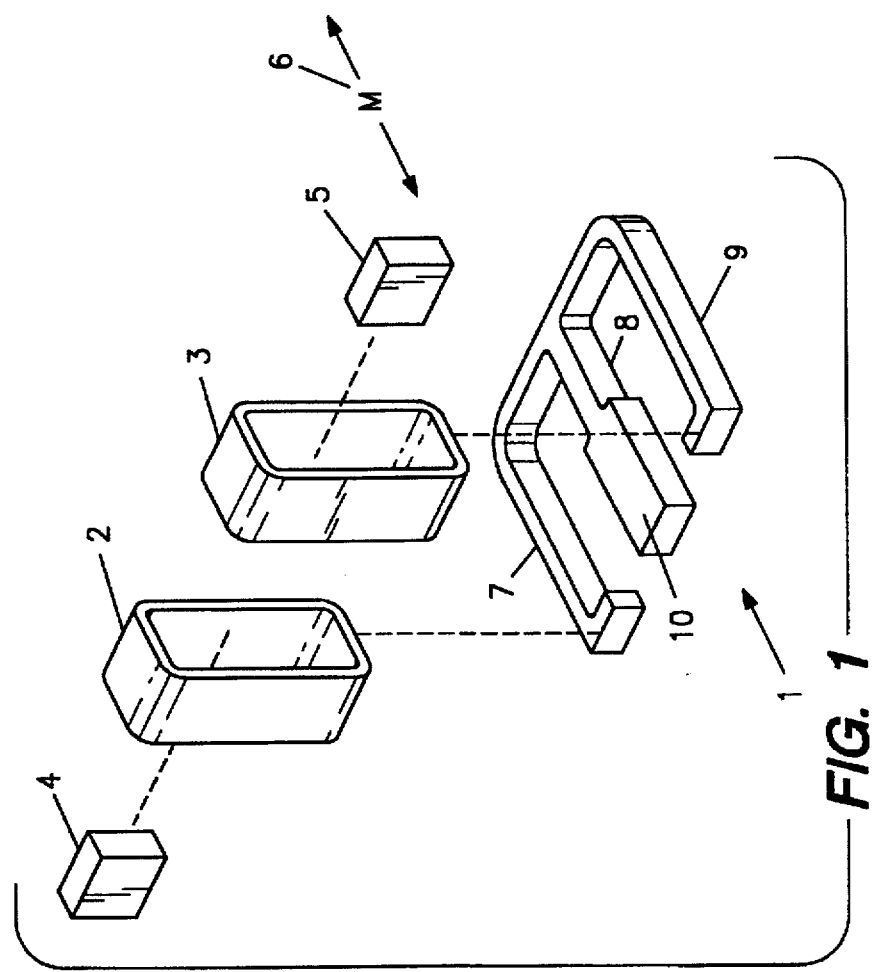
FIG. 1 is an exploded perspective view of an inertial element according to the present invention.

Referring now to FIG. 1, a tuning fork 1 with three tynes 7, 8 and 9 is formed by fine blanking, stamping, etching or electro-discharge machining from a sheet of such metal as elinvar, stainless steel, beryllium copper, or spring steel. Alternatively, such tuning fork may be formed of QUARTZ using conventional etching techniques. The left tyne 7 and the right tyne 9 are symmetrical in dimension to provide symmetrical elastic spring properties in the homogeneous material of the fork 1. Making the left tyne 7 and the right tyne 9 from the same sheet material and with the same manufacturing process ensures good dimensional and elastic symmetry. In general, the material of which the fork 1 is formed should maintain constant stiffness with temperature variations (over reasonable operating range) to ensure that the natural vibration frequency remains substantially constant with temperature variations. Center tyne 8 provides flexible support in integral formation with mounting flange 10.

Figure 2:
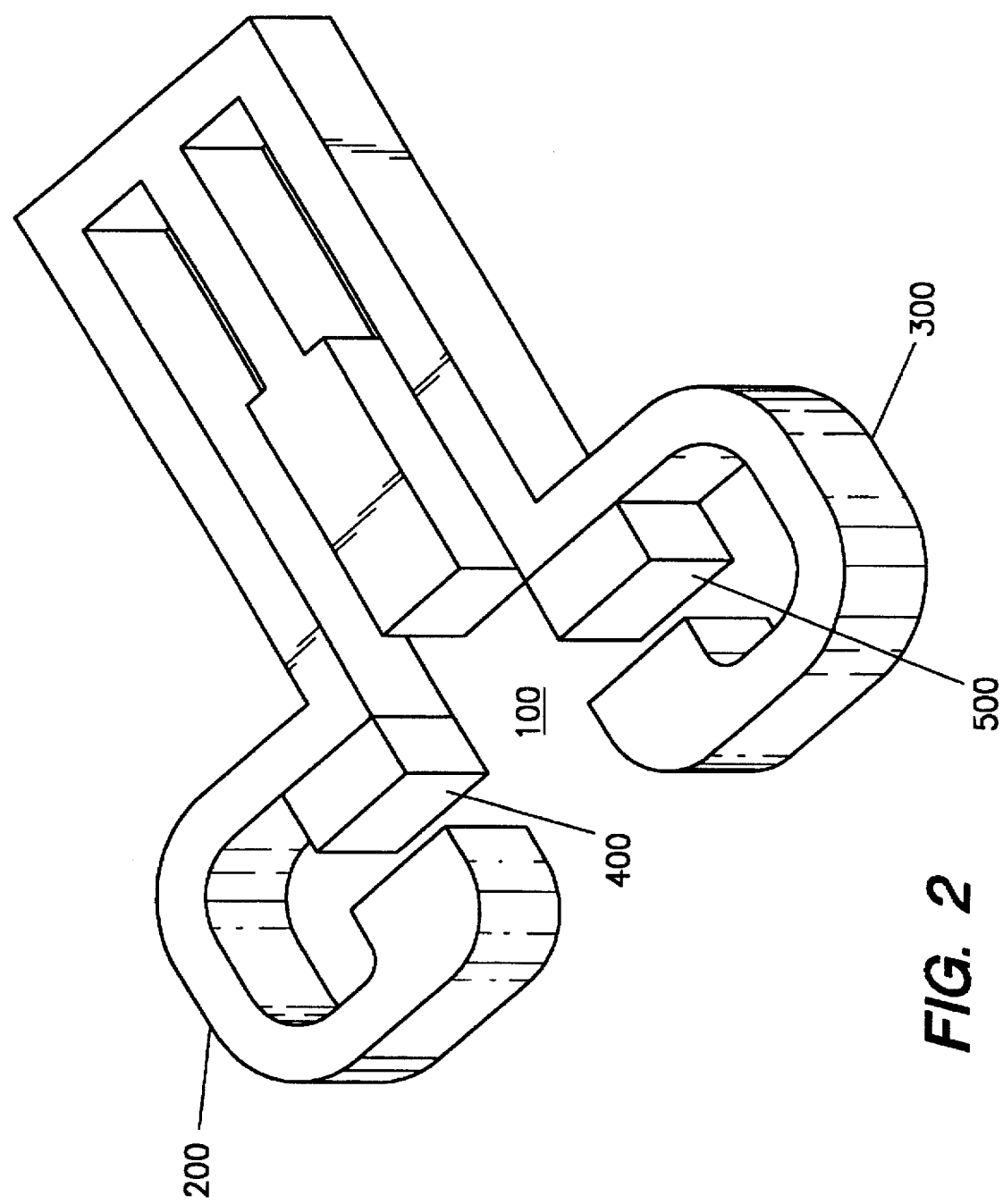
FIG. 2 is a perspective view of an alternate embodiment of the inertial element of FIG. 1.

Magnetic return paths 2 and 3 are affixed to the ends of the tynes 7, 9 of the tuning fork 1 in conventional manner such as by adhesive, laser welding, soldering or vacuum-furnace brazing. Return paths 2 and 3 may be formed by extrusion, blanking or electro-discharge machining of magnetic material. In an alternative embodiment, similar return paths 200, 300 may be formed integrally with tuning fork 100, of magnetic material, as shown in FIG. 2.

Magnets 4 and 5 are affixed in conventional manner to magnetic return paths 2 and 3 by adhesive, self-attraction, mechanical fastening, soldering, or welding. Alternatively, as shown in FIG. 2, the magnets 400, 500 may be affixed to ends of the tynes within the magnetic return paths 200, 300. Both magnets 4 and 5 (or 400, 500) are magnetized as shown by magnetic vector 6, and can be magnetized before or after assembly to magnetic return paths 2 and 3.

Magnetic return paths 2 and 3 channel the flux from magnets 4 and 5 to flow in a closed loop and across the gap in alignment with the magnetic vector 6. This minimizes magnetic interaction with other metallic pads such as a magnetic shield in close proximity to the tuning fork 1.

Figure 3:
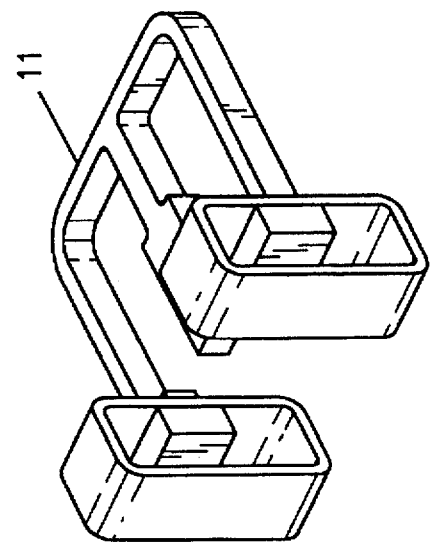
FIG. 3 is a perspective view of an assembled inertial element of FIG. 1.

FIG. 3 illustrates the completed tuning fork assembly 11 comprising the components illustrated in FIG. 1.

FIG. 4 is an exploded view illustrating the assembly of the tuning fork 11 to printed circuit board 13. Mounting flange 10 is affixed to mount 12 in conventional manner, for example, by adhesive, laser welding, soldering, vacuum-furnace brazing, or mechanical fastening. Mount 12 is then attached, for example, by soldering, welding, brazing, or mechanical fastening to printed circuit board 13.

FIGS. 5 illustrates the completed assembly of tuning fork 11 and printed circuit board 13, with the attached magnets 4, 5 and return paths 2, 3 elevated above the circuit board 13 for adequate clearance to provide free vibrational movement thereof.

The exploded perspective view of FIG. 6A illustrates the orientation of the coil assembly 14 relative to printed circuit board 13 and within the gap between magnets 4,5 and return paths 2,3. This coil assembly 14 is positioned so that the principle orientation of its coils are aligned with the principle axes of vibration of tuning fork assembly 11 (i.e., laterally within the plane of tynes 2, 3 and mount 10). This eliminates the necessity of removing material from the vibrating element, as is common on piezoelectric gyroscopes to reorient the vibrational axis. The coil assembly 14 may be fixed by soldering or welding the contact pads 15 through 20 to pins 21 through 26 to provide mechanical as well as electrical connection. Alternatively, this assembly may be accomplished using laser welding, brazing, or mechanical fastening.

Figure 7A:
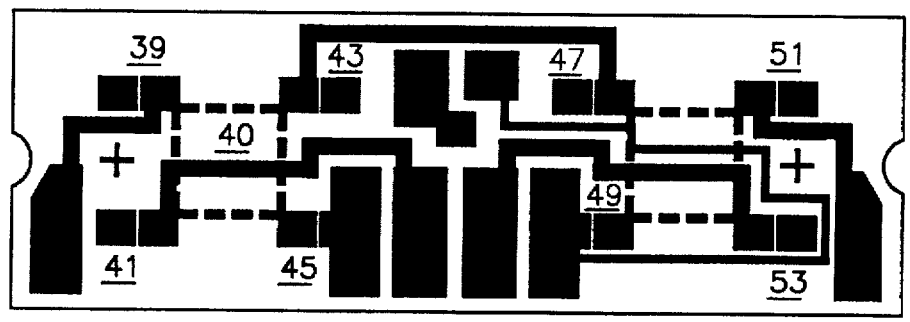
Figure 7B:
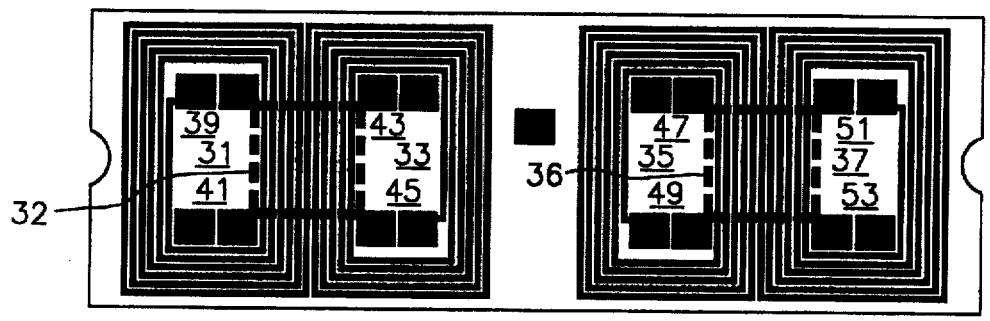

Referring now to FIG. 7B, there is shown an initial one of several layers within the coil assembly 14 illustrating the spiral-oriented, figure-8 layout of coil conductors. The pair of coils 31, 33 are disposed in spacial separation from a mating pair of coils 35, 37 by a spacing substantially corresponding to the spacing between magnets 4, 5 on the ends of the tynes 7, 9 of the vibrating fork. Specifically, the adjacent pair of loops per configuration 31, 33 and 35, 37 include common central regions 32, 36 within which electrical signal current in the conductor common to the pair of loops flows in a common direction, despite that such conductor coils in opposite directions within each of the adjacent loops. One or more successive layers, as illustrated in FIGS. 7C and 7D, may be stacked together and interconnected via corresponding contact pads 39–53 and through connections to the outer contact layer 40, as shown in FIG. 7A, thereby to form coils with greater numbers of turns for operation on lower signal levels.

Figure 7C:
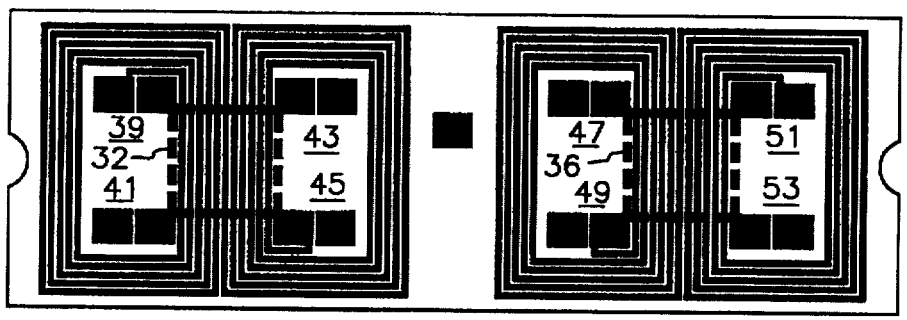
Figure 7D:
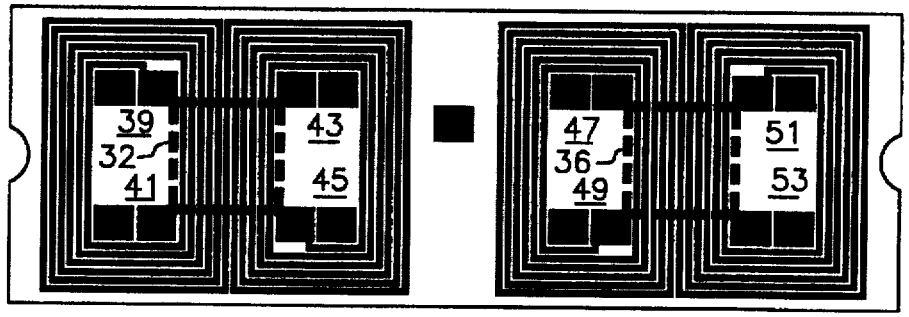

The coil assembly thus far described includes one or more layers of spiral oriented, figure-8 layout of coil conductors on circuit boards, as shown in FIGS. 8A, 8B, and 8C, that are aligned with the layers of coils shown in FIGS. 7B, 7C, and 7D previously described. The conductors in the aligned central regions 32, 36 conduct signal current in a direction orthogonal to the direction of current conduction through the conductors of the coils shown in FIGS. 7B–7D. Again, these layers of coils shown in FIGS. 8A–8C may be interconnected via the associated contact pads and through connections for the outer contact layer 40. The central regions 32, 36 of the pairs of coils are aligned with the corresponding magnets 4, 5, for reasons as later described herein, as the coil assembly 14 is affixed in position on the pins 22–25 on the circuit board 13.

Referring now to FIGS. 6B and 7B, it should be noted that the magnetic flux of a magnet 4 or 5 passes through the associated magnetic return 2 or 3 and through the coil assembly 14 in the central regions 32, 36 thereof. Thus, electrical signal applied to one of the pairs of coils, say 31, 33 (and though the associated additional coils in the layers of FIGS. 7C and 7D), thus produces a motive force in the lateral direction (i.e., within the plane of the tynes 7, 9 and mount 10) as the vector product of magnetic flux in the central region 32 and signal current flowing in a common direction in the conductors of the coils that intersect the central region 32. This force translates to displacement of the tyne 7 against the resilient restoring force of the tyne 7 to set up oscillatory motion back and forth through the central region 32 in response to a corresponding oscillatory signal current supplied to the conductors of the coils intersecting the central region 32.

The opposite tyne 9 of the vibrating fork moves in sympathetic vibration (out of phase with the movement of the driven tyne 7) in conventional manner and generates an electrical signal within the conductors of the aligned coils 35, 37 (and associated other layers of coils of FIGS. 7C and 7D) that intersect the central region 36. Such electrical signal is formed in conventional manner as the vector product of the rate of change of flux through the number of conductors intersecting the central region, and this electrical signal may serve as a feedback signal to control the oscillatory drive signal applied to the companion coils 31, 33 for maintaining vibratory oscillations in the tynes 7, 9 at a selected amplitude and frequency approximating the natural resonance of the vibrating fork.

Figure 10:
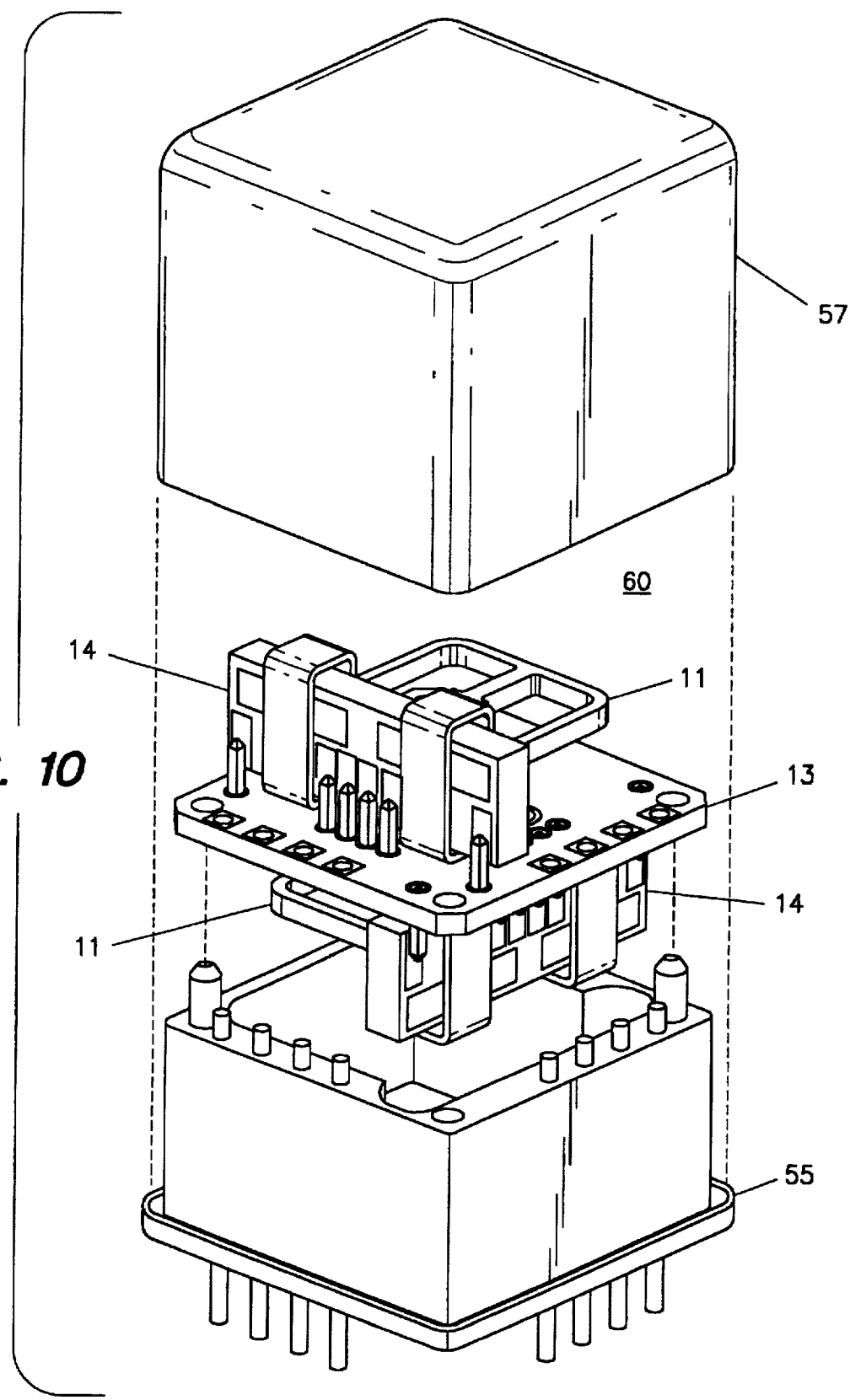
FIG. 10 is an exploded perspective view of two inertial elements orthogonally oriented on a common mounting base.

As illustrated in FIG. 10, a dual axis gyroscope may be formed using a pair of assemblies of FIG. 6B mounted on the same substrate 13, with both gyroscopes oriented in orthogonal relationship. The substrate is mounted in a plastic base 55, and a magnetic shield 57 encloses the unit 60.

Figure 11:
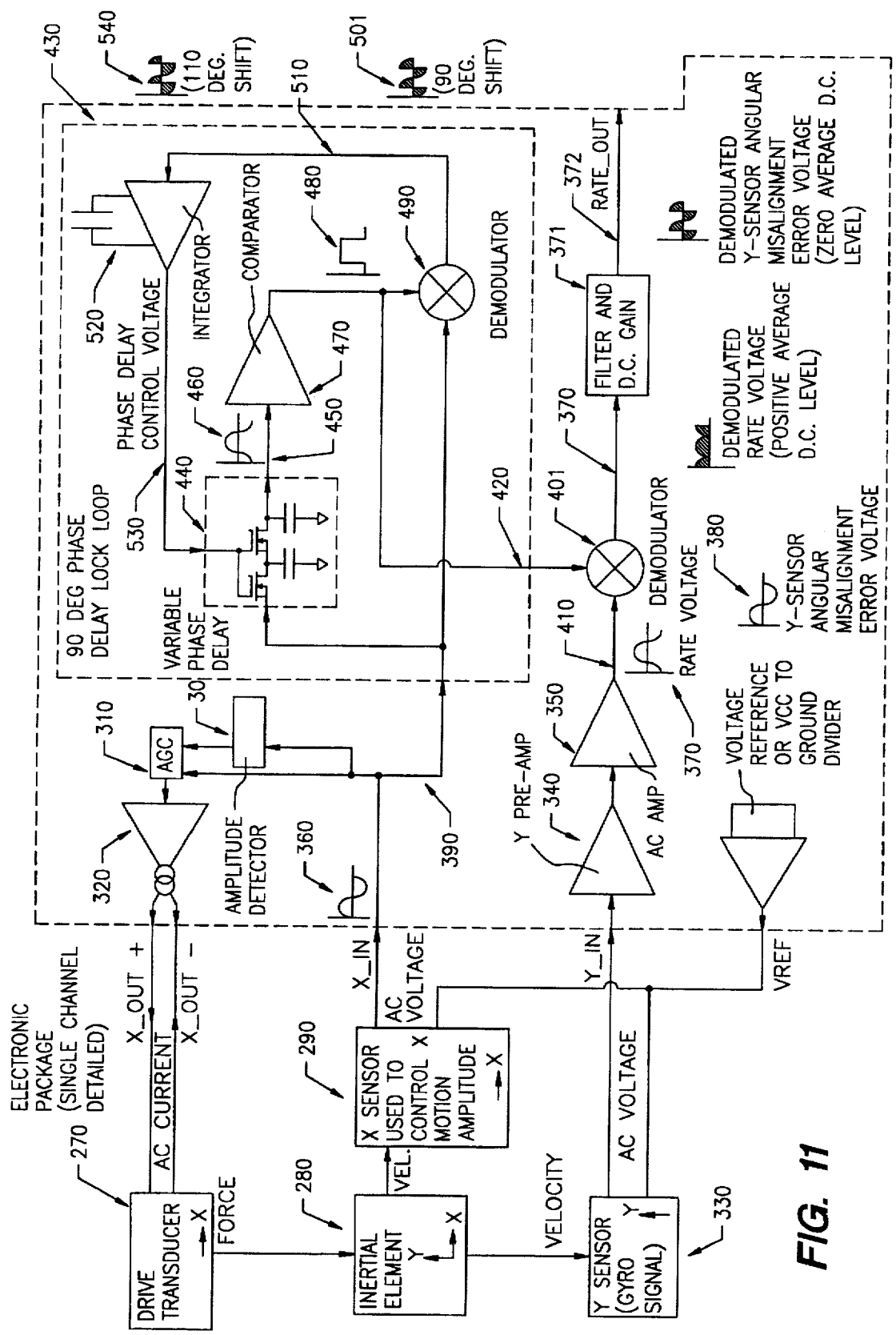
FIG. 11 is a schematic diagram of a phase delay lock circuit for operation with an inertial element according to FIGS. 6A and 6B.

FIG. 11 is a block diagram of the electronic circuitry for each axis gyroscope. Drive transducer 270 includes a portion of the coil assembly 31, 33 and a magnetic structure 2, 4 attached to one of the tynes 7. Inertial element 280 refers to the tuning fork assembly, as illustrated in FIG. 5. X sensor 290 is the coil (for example, coils 35, 37 of FIG. 7B) and magnetic structure 3, 5 which serves as a drive feedback sensor, and which provides phase and amplitude information to the circuit about the physical vibration of the inertial element 11. Amplitude detector 30, automatic gain controller 310, and controlled current source 320 operate in conventional manner to sustain the vibration of the inertial element 11 at a constant amplitude and at a frequency determined substantially by the natural resonance of the inertial element 11. The signal 390 from X sensor 290 that includes the coils 35, 37 serves as a phase reference 360 for demodulating the rate signal, and this phase may be arbitrarily defined as 0 degrees.

The Y sensor includes the coils, as illustrated in FIGS. 8A–8C, and the magnets 4, 5 for sensing the differential velocity of the tynes, Y pre-amplifier 340 and AC amplifier 350 boost the level of the signal received from the coils of FIGS. 8A–8C prior to demodulation.

During normal operation of the inertial element 11, unperturbed by the angular movement, the tynes 7, 9 vibrate laterally within the plane of the tynes (i.e., along the x axis) without any orthogonal elevation normal to the plane of the tynes. Thus, the tynes 7, 9 with attached magnets 4, 5 and return paths 2, 3 vibrationally traverse the central regions 32, 36 of the sense coils of FIGS. 8A–8C in a direction aligned with the conductors that traverse the central regions 32, 36, and therefore produce no emf in the conductors. This is illustrated in a time sequence of tyne positions designated by A, B, C, and D as shown in FIG. 13A. However, if angular rate movement occurs about the sensitive axis of the gyroscope (i.e. parallel to center type 8) then vibrating tynes 7, 9 and associated magnetic regions 32, 36 will be differentially displaced relative to the x-axis due to the inertial momentum of these elements, with associated differential vibrational movement of the tynes relative to the central regions 32, 36. The resulting trajectories of this vibrational motion are illustrated in FIG. 13B along the time-sequenced positions A, B, C, and D.

Diagram 370 illustrates the phase of the voltage from Y sensor 330 resulting from an angular rate of movement. This voltage has a 90-degree phase relative to the phase reference signal 390. Diagram 380 shows the phase of a primary error voltage which may be due to any angular misalignment of the Y transducer relative to the primary vibrating direction along the x axis, and this error voltage has a phase of 0 degrees relative to phase reference signal 390. Ideally, such error voltage is reduced to zero by proper alignment of the coil assembly 14 with the magnetic elements on the tynes 7, 9 during assembly as illustrated in FIGS. 6A and 6B. Sensor signal 410 is a composite voltage which is the sum of rate voltage 370 and any error voltage 380. Ideally, demodulator 401 will reject error voltage 380 while passing rate voltage 370. To accurately reject error voltage 380, the phase reference signal 420 must have a phase which is 90 degrees relative to error voltage 380, and thus a phase of 90 degrees relative to phase reference signal 390.

The phase delay lock circuit 430 provides an accurate 90 degree phase shift from phase reference signal 390 in the phase reference signal 420. Variable phase delay circuit 440 includes two field-effect transistors which are connected to operate as controlled resistors and two capacitors. Each such resistor-capacitor pair provides 45 degrees of phase shift, resulting in a signal 450 which is sinusoidal, but is phase shifted by 90 degrees, as illustrated by waveform 460. Comparator 470 converts the sinusoidal signal 450 to a square wave as the phase reference signal 420, as illustrated by waveform 480, which is supplied as the phase reference signal to demodulator 490. When signal 420 is exactly 90 degrees shifted from phase reference signal 390, then the output 510 from demodulator 490 will have the waveform as illustrated 501, which has zero D.C. level. When output 510 has zero D.C. level, then integrator 520 will not charge or discharge, so phase-delay control voltage 530 that is supplied to the gate electrodes of the field-effect transistors in the phase delay circuit 440 will remain constant.

If the phase delay circuit, or phase shifter, 440 does not produce a 90 degree phase shift, as when the circuit is initially started, then the phase error causes integrator 520 to charge or discharge until the phase error is corrected. For example, if phase shifter 440 is producing a 110-degree phase shift, then the output 510 of demodulator 490 will have the waveform 540. The D.C. level of waveform 540 is below 0, so integretor 520 will charge up, and thereby cause phase-delay control voltage 530 to increase. This increased voltage will reduce the resistance of the field-effect transistors in phase delay circuit 440, which, in turn, will reduce the phase shift until a 90-degree phase shift is attained. Because the 90-degree phase shift is accurate over time and temperature, error voltages caused by physical misalignment between Y sensor 330 and the primary vibration direction of the inertial element will thus be rejected at demodulator 401, and will not cause an error in the output 372 of the gyroscope that produced by modulator 401 and filtered by filter and amplifier 371. Of course, a circuit according to FIG. 11 is required for each inertial element within assembly 60 in order to provide angular rate outputs 372 from each associated inertial element.

As the temperature of the vibrating fork changes, the resonance quality factor, or Q, may change, resulting in different amplitude of drive current in the coil to maintain a constant vibrational amplitude. Also, as the temperature changes, the magnetic field strength may change, again resulting in different amplitude of drive current in the coil in order to maintain a constant vibrational amplitude. In addition, the sensed voltage for a given vibrational amplitude will change because the velocity-to-voltage conversion efficiency (i.e., the rate of change of flux on a conductor) is proportional to the magnetic field. The AGC control 310 compensates for this by adjusting the amplitude of the drive current until the X-sensed voltage is equal to a reference voltage. Since the X sensor and Y sensor are sharing the same magnetic field on one tyne, they have conversion efficiencies which are both proportional to the same magnetic field. Therefore, the ratio between the conversion efficiencies of the X and Y sensors remains constant.

On the other tyne, the Y sensor uses the magnetic field generated by the associated magnet and return path with similar properties to the first tyne. Thus, at a given temperature, the Y sensor will have a substantially similar conversion efficiency as the Y sensor on the first tyne. If the magnetic field changes, the AGC circuit 310 adjusts the amplitude of vibrational motion to maintain the same X voltage amplitude.

The angular rate signal 372 is proportional to the ratio of Y motion amplitude to X motion amplitude, so as long as the conversion efficiencies on X sensors and Y sensors are substantially equal, then holding X feedback voltage constant by the operation of the AGC circuit 310 ensures that Y voltage due to angular rate will also remain constant despite the fact that the X and Y sensor conversion efficiencies may both be changing at about the same rate.

Referring again to FIG. 8A, magnetic region 32 is intersected by coils 71 and 72 which produce electrical signal "LS" that represents the velocity of magnetic region 32 relative to coils 71 and 72 in the "+Y" direction, as indicated 711 on FIG. 8A. Magnetic region 36 is intersected by coils 73 and 74, which produce electrical signal "RS" that represents the velocity of magnetic region 32 relative to coils 71 and 72 in the "+Y" direction, as indicated 711 on FIGS. 8A.

For basic operation as described in FIG. 11, coils 71, 72, 73 and 74 may be connected in series to produce a voltage YIN where YIN=RS−LS. In other words, YIN represents the velocity of the magnetic region 36 in the +Y direction summed with the velocity of magnetic region 32 in the −Y direction. The YIN electrical signal may be considered to be the "YIN" signal produced by the "Y sensor" 330 of FIG. 11.

Figure 12:
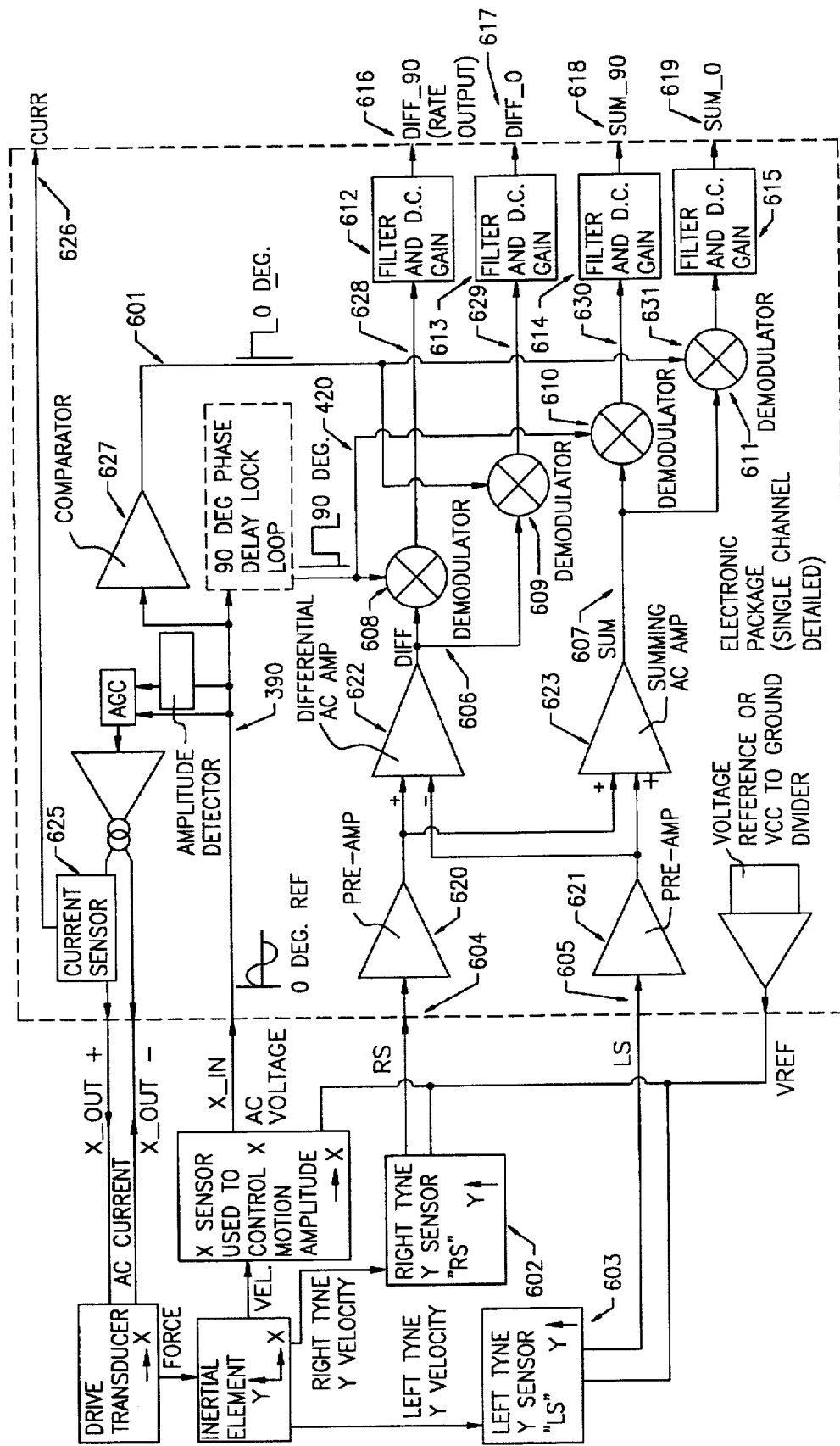
FIG. 12 is a schematic diagram of a circuit for operation with a vibrating fork assembly.

Alternatively, as shown in FIG. 12, the coils 71 and 72 may not be connected in series with coils 73 and 74. In this case, coils 71 and 72 correspond to left tyne sensor 603, and coils 73 and 74 correspond to right tyne sensor 602. Signals RS 604 and LS 605 are each preamplied by preamplifers 620 and 621, respectively. If there is a difference in the velocity-to-voltage conversion efficiencies of left tyne Y sensor 603 and right tyne Y sensor 604, as would be the case if magnetic field region 32 had a different strength than magnetic field region 36, then such difference may be calibrated and corrected by independently adjusting the relative gains of pre-amplifer 620 and pre-amplifier 621.

Difference amplifier 622 produces the DIFF signal 606 in conventional manner by subtracting the LS signal from the RS signal. The DIFF signal 606 corresponds to the signal 410 of FIG. 11 that represents the velocity of the magnetic region 36 (of FIG. 8a) in the +Y direction summed with the velocity of the magnetic region 32 in the −Y direction. Summing amplifier 623 produces the SUM signal 607 in conventional manner by adding the LS signal with the RS signal.

Demodulators 608 to 611 demodulate the DIFF 606 and SUM 607 signals using 90-degree phase reference 420 and 0-degree phase reference 601 that is produced by comparator 627 from sinusoidal signal 390. The outputs from the demodulators are signals 628–631 which are filtered and D.C. amplified 612–615 and are available as analog outputs DIFF_90 (rate output), DIFF_0, SUM_90, and SUM_0, identified in FIG. 12 as 616–619. AC current sensor 625 measures the alternating current which passes through the drive coils and produces a DC voltage CURR 626 which is proportional to that current. The CURR signal output may be used for drift compensation, as described below.

Referring now to FIGS. 13A through 13E, a variety of paths of left tyne magnetic region 32 are shown by trajectories 701, 703, 705, 707, 709 and the corresponding paths of right tyne magnetic region 36 are shown by trajectories 702, 704, 706, 708 and 710. The orientation of the Y sensor, which includes coils 71, 72, 73 and 74, is shown by coordinate system 711.

FIG. 13A illustrates the ideal trajectories for a perfectly aligned, non-rotating vibrating fork. Locations A, B, C and D illustrate 4 positions of each magnetic region during 0 degrees, 90 degrees, 180 degrees and 270 degrees, respectively, of one vibration cycle. Referring to FIG. 14A, the XIN electrical signal 712 is produced by the X sensor coils 31, 33, 35 and 37 as an indication of tyne velocity parallel to the X coordinate of coordinate system 711. The DIFF and SUM waveforms 713 and 714 represent the output of amplifiers 622, 623 (in FIG. 12). With no Y motion of either tyne, waveforms 713 and 714 have zero amplitude. Accordingly, as illustrated by Table 715, each demodulated filtered output DIFF_90, DIFF_0, SUM_90, SUM_0 (616 –619) is zero.

FIG. 13B illustrates the ideal trajectories of the left and right tynes for a perfectly aligned vibrating fork rotating at a given angular rate about an axis parallel to mounting tyne 8. In FIG. 14B, the DIFF and SUM waveforms 716 and 717 represent the output of amplifiers 622, 623 (in FIG. 12) under this operating condition. In this case, the Y velocity is delayed in phase by 90 degrees compared to the X velocity. While the right tyne has positive Y velocity, the left tyne has negative Y velocity, so the DIFF waveform has a net signal while the SUM signal is zero. Accordingly, as illustrated by Table 718, the DIFF_90 output 616 is positive, while the other outputs are zero.

The trajectories of FIG. 13B and the waveforms of FIG. 14B can also result from a misalignment of the X driving force relative to the principle axis of elastic stiffness for tuning fork assembly 11, even if there is no angular rate of movement of the fork assembly. Such drive force misalignment accordingly causes an error in DIFF_90 (616) which is the primary rate output of the device. In order to reduce this error during assembly, coil assembly 14 may be rotated about the center tyne axis 8, while monitoring output DIFF_90 (616) until output DIFF_90 becomes substantially zero. When DIFF_90 is substantially zero, then coil assembly 14 may be bonded in fixed position to pins 21 through 26.

FIG. 13C illustrates the trajectories for a static device which does not have any drive force misalignment, but which does have a Y sensor rotational mis-alignment relative to the principle axis of elastic stiffness for tuning fork assembly 11. This can be seen by viewing the angular misalignment of trajectories 705 and 706 relative to coordinate system 711, which represents the Y sensor orientation. In FIG. 14C, the DIFF and SUM waveforms 719 and 720 represent the output of amplifiers 622, 623 (in FIG. 12). In this case, the Y velocity is in phase (0 degrees) compared to the X velocity. As illustrated by position B, while the right tyne has positive Y velocity, the left tyne has negative Y velocity, so the DIFF waveform has a net signal, while the SUM signal is zero. Accordingly, as illustrated by Table 721, the DIFF_0 output 617 is positive, while the other outputs are zero. In summary, Y sensor angular misalignment causes an error in DIFF_0 (617). While this is not the primary rate output for the instrument, any phase error in phase shifter 430 will cause some of this error to appear in the primary rate DIFF_90 output. In order to reduce this error during assembly, coil assembly 14 may be rotated about the center tyne axis 8, while monitoring output DIFF_0 (617), until output DIFF_0 becomes substantially zero. When DIFF_0 is substantially zero, then coil assembly 14 may be bonded in fixed position to pins 21 through 26. Thus, with drive and sense coils on the same assembly, then rotation of the coil assembly of FIGS. 7 and 8 minimizes the error shown in FIG. 13B (Diff 0) and also sufficiently minimizes the error shown in 13C (Diff 90), as discussed above, and two separate outputs are available for determining the correct rotational alignment between the coil assembly 14 and the principle axis of elasticity of tuning fork assembly 11. For the coil assembly 14 as described above, the drive force coils (X forcer) and the sense coils (Y sensor) are solidly mounted within the same assembly. As they are formed substantially 90 degrees from each other, it is sufficient to utilize only the DIFF_0 output in order to adequately align the coil assembly before bonding the assembly in fixed position. In the event that the coil assembly 14 was formed with a substantial error in the 90 degree angle between the drive force coils (X forcer) and the sense coils (Y sensor), then it would be impossible to find an angular orientation for which both the DIFF_0 and the DIFF_90 outputs were substantially zero simultaneously. In an alternate embodiment, however, the drive coils (X forcer) may be formed on a separate assembly from sense coils (Y sensor). In this case, the drive coil assembly could be rotated in order to reduce DIFF_90 to zero. Independently, the sense coil assembly could be rotated in order to reduce DIFF_0 to zero. Then, both coil assemblies could be bonded or otherwise fixed in such calibrated orientations.

FIG. 13D illustrates one type of trajectory for the left and right tynes which can result from asymmetries in tuning fork assembly 11 and/or the mounting stiffness for the instrument. The trajectories 707 and 708 are misaligned relative to the Y sensor orientation in the coordinate system 711. In FIG. 14D, the DIFF and SUM waveforms 722 and 723 represent the output of amplifiers 622, 623 (in FIG. 12). In this case, the Y velocity is in phase (0 degrees) compared to the X velocity. As illustrated by position B, while the right tyne has positive Y velocity, the left tyne also has a positive Y velocity, so the SUM waveform has a net signal, while the DIFF signal is zero. Accordingly, as illustrated by table 724, the SUM_0 output 619 is positive and the other outputs are zero. In summary, a difference in elasticity in the left and right tynes along the principle axis of vibration can cause an error in SUM_0 (619). While this is not the primary rate output, any phase error in phase shifter 430 coupled with a common mode rejection error of differential amplifier 622 will cause some of this error to appear in the DIFF_90 output that is the primary rate output. In order to reduce this error during assembly, tuning fork assembly 14 may be trimmed by material removal or mass addition until output SUM_0 becomes substantially zero.

FIG. 13E illustrates a second type of trajectory for the left and right tynes which can result from asymmetries in tuning fork assembly 11 and/or the mounting stiffness for the assembly. The trajectories 709 and 710 are misaligned relative to the Y sensor orientation in the coordinate system 711. In FIG. 14E, the DIFF and SUM waveforms 725 and 726 represent the output of amplifiers 622, 623 (in FIG. 12). In this case, the Y velocity is delayed in phase by 90 degrees compared to the X velocity. As illustrated by position C, while the right tyne has positive Y velocity, the left tyne also has positive Y velocity, so the SUM waveform has a net signal, while the DIFF signal is zero. Accordingly, as illustrated by table 724, the SUM_90 output 619 is positive, while the other outputs are zero. In summary, elastic asymmetry in tuning fork 11 or in the mounting system for the instrument can cause an error in SUM_90 (618). While this is not the primary rate output for the instrument, any common mode rejection error of differential amplifier 622 will cause some of this error to appear in the DIFF_90 primary rate output. In order to reduce this error during assembly, tuning fork assembly 11 may be trimmed by material removal or mass addition until output SUM_90 becomes substantially zero.

Figure 16A:
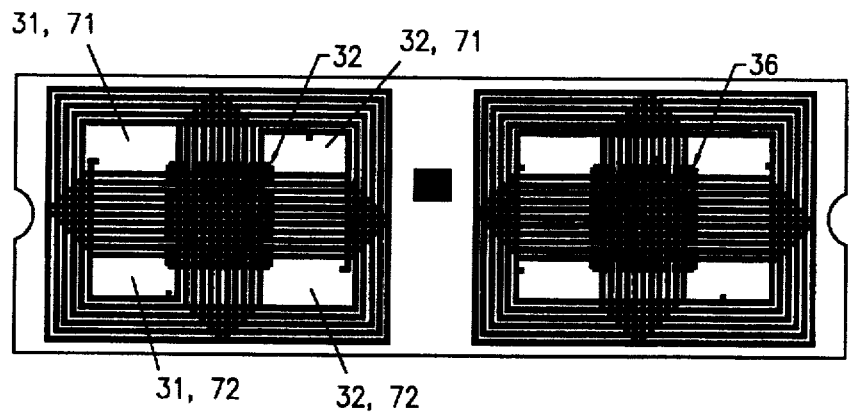
FIGS. 16A–16C are pictorial diagrams of the coil assembly showing operational conditions relative to orientations of magnetic fields.
Figure 16B:
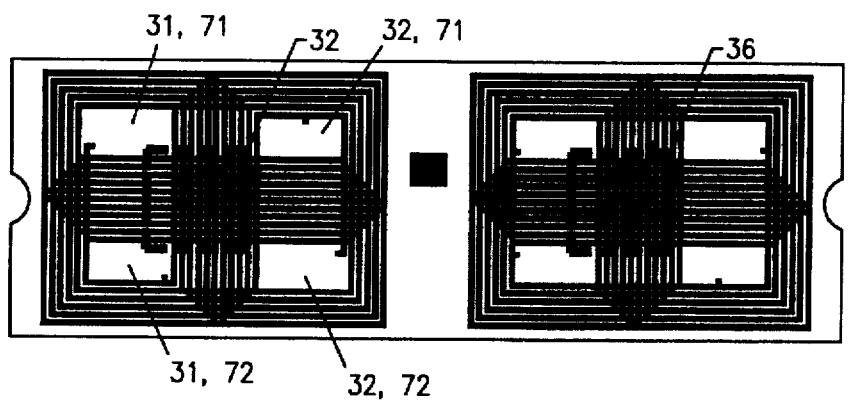
Figure 16C:
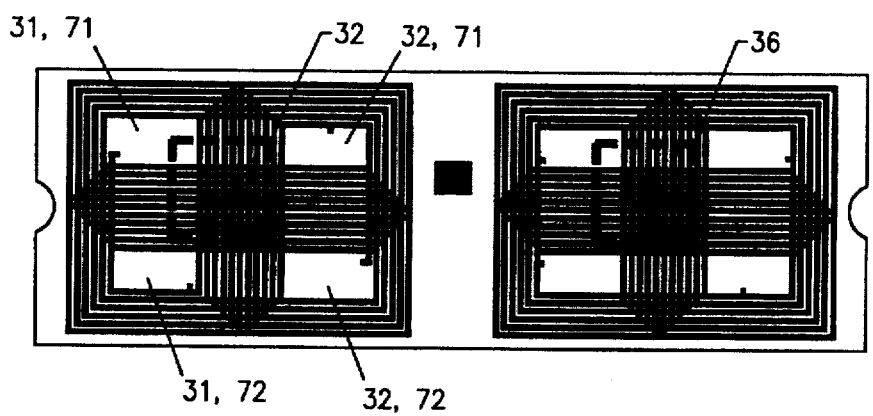

FIGS. 16A, 16B and 16C illustrate coil assembly 14 and show both the drive coils 31, 33 and the sense coils 71, 72. The legend numbers for each coil 31, 33, 71, 72 are positioned in each of the two quadrants enclosed by the coil to which the legend applies. Magnetic region 32 is in close proximity to magnet 4 and return path 2, both of which have a much higher permeability than that of free space. When current flows in coils 31 and 33, then magnetic region 32 couples flux into coils 71 and 72 to induce a voltage in coils 71, 72. Coils 71, 72 are part of the sensing system, so the induced voltage has the potential to produce an error voltage in the primary output of the device. The coupling from coils 31, 33 to coils 71, 72 is referred to as mutual inductance. The mutual inductance error voltage is shifted in phase by 90 degrees from the current in coils 31, 33, which is in phase with the X component of the velocity, which in turn is used as the demodulation phase reference. Accordingly, the mutual inductance error voltage propagates through the demodulators that use a 90 degree phase reference and will affect the DIFF_90 and SUM_90 outputs 616, 618.

FIGS. 16A and 16B illustrate the advantage of the present coil geometry, in which misalignments in purely X or Y position cause small mutual inductance errors. In FIG. 16A, magnetic region 32 is shown in its aligned position. There is equal area of region 32 in both coils 31 and 33, which are wound in opposite directions through region 32. Accordingly, there is zero mutual inductance between coils 31, 33 and coils 71,72. Even if magnetic region 32 were displaced in the purely Y direction 711, from its position as shown in FIG. 16A, then there would still be equal area in coils 31, 33 and there would still be zero mutual inductance between coils 31, 33 and coils 71, 72. In FIG. 16B, magnetic region 32 is shown misaligned in the X direction in the coordinate system 711. Coil 31 encloses more area of magnetic region 32 than coil 33. Accordingly, current flowing in coils 31, 33, will cause a non-zero net flux to flow through magnetic region 32, and through the magnetic circuit including magnet 4 and return path 2. However, coils 71 and 72 each share equal area of magnetic region 32, and coil 71 and 72 are wound in opposite directions, so the induced voltage on coil 71 will be counteracted by the induced voltage on coil 72. Thus, misalignment in the purely X direction does not cause any mutual inductance between coils 31, 33 and coils 71, 72. In FIG. 16C, magnetic region 32 is misaligned in both the X and Y directions. In this case, a non-zero flux will flow through magnetic region 32, and the induced voltage on coil 71 will not be perfectly counteracted by coil 72. Therefore, there will be a non-zero mutual inductance between coils 31, 33 and coils 71, 72 under these conditions. Such mutual inductance may be measured by intentionally driving a known sinusoidal current through coils 31, 33 and measuring the induced voltage on coils 71, 72. The current should be at a frequency which is different from any mechanical resonant frequency so that the mutual inductance can be measured without exciting mechanical vibration.

During assembly, mutual inductance may be minimized by positioning coil assembly 14 in the X and/or Y directions while measuring mutual inductance as described in the preceding paragraph. When mutual inductance is substantially minimized, then the coil assembly may be bonded or otherwise secured in fixed position. This positioning step may be done before or after rotating the coil assembly to minimize the errors described with reference to FIGS. 13B and 13C.

Figure 15:
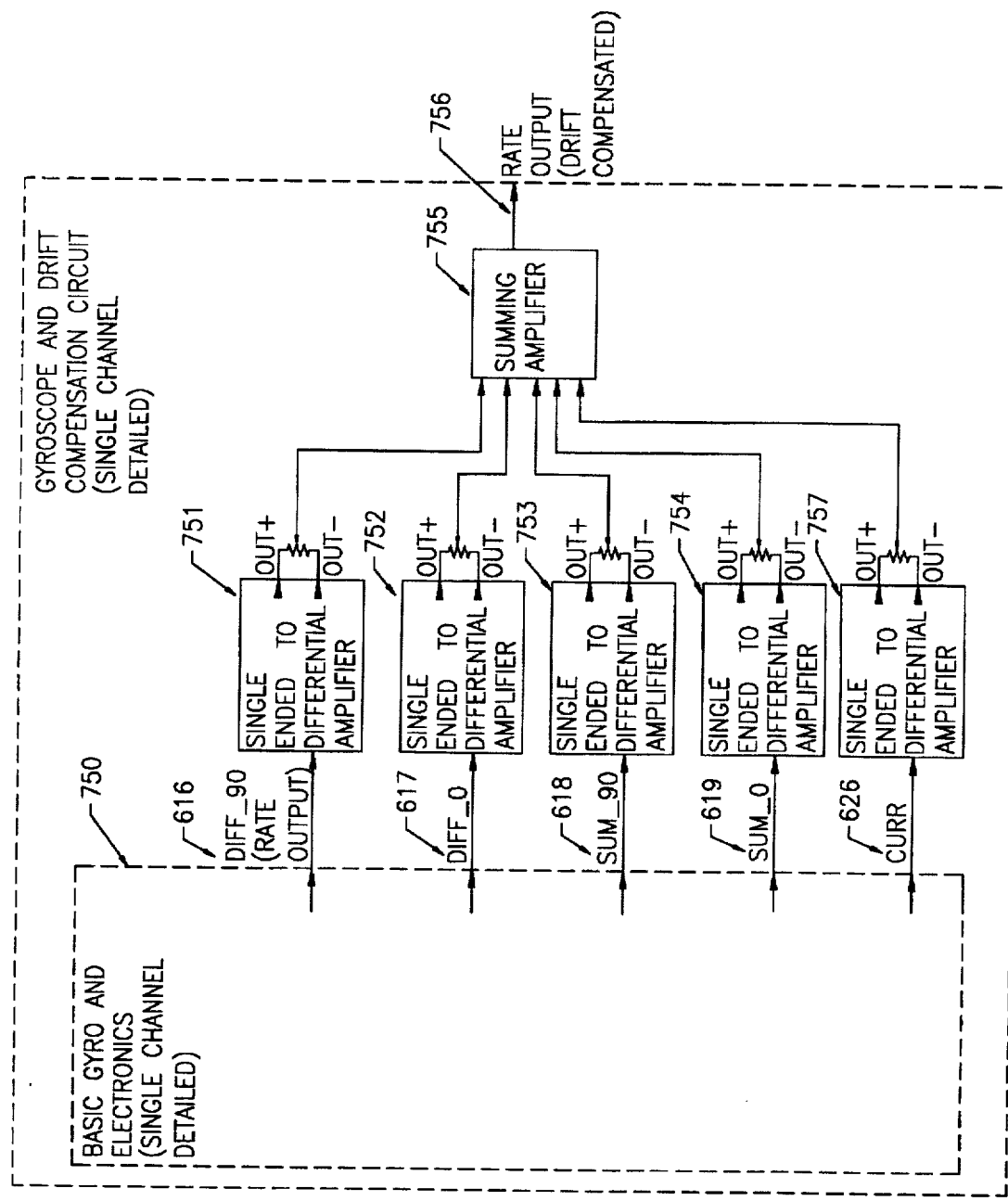
FIG. 15 is a schematic diagram of an error compensation circuit according to the present invention.

Referring now to FIG. 15, the primary rate output DIFF_90 (616) ideally represents angular rate of the vibrating fork assembly and ideally it is independent of errors in the assembly and its operating environment, such as manufacturing imperfections, mutual inductance of its coils, operating temperature and the stiffness of the mounting system. In practice, the primary rate output DIFF_90 is not completely free from dependence upon errors in the assembly and the environment. It is desirable to generate rate output which is substantially free from dependence upon errors, so correction technique may be employed, as described below.

The DIFF_0, SUM_90, SUM_0 and CURR outputs 617, 618, 619 and 626 do not depend on angular rate of the vibrating fork assembly, but they do depend upon errors such as manufacturing imperfections, operating temperature and stiffness of the mounting system. The error dependence of the outputs 616, 617, 618, 619 and 626 may be measured by operating the instrument under various environments and mounting systems, then measuring the voltage at these outputs for each condition. Once the error dependence of each output is characterized, then it is possible to set the adjustable resistors connected across the differential outputs of the single-ended input amplifiers 751,752, 753, 754 and 757 in such a manner that the error dependence of the final output 756 is substantially independent of error, while retaining dependence upon angular rate of the vibrating fork assembly.

The functionality of FIG. 15 may be executed by analog circuits, as shown, or may be executed by a digital system in which the outputs 616, 617, 618, 619 and 626 are sampled with an analog-to-digital converter. Then, a microprocessor may compute the rate output successively by executing a calculation function that depends upon the sampled values as well as calibration constants which may be determined during assembly and then stored in non-volatile memory as suitable correction factors to be incorporated into the calculation function in conventional manner.

It should be noted from the above descriptions and analyses of the possible oscillatory trajectories of the vibrating tynes and the associated resulting electrical signals that the vibratory device of the present invention may also serve as an accelerometer responsive to movements normal to the plane of vibration, and to movements in the plane of vibration aligned with the vibrational direction of the tynes.

Returning now to FIG. 1, in a perfectly symmetrical tuning fork, the left tyne 7 and the right tyne 9 are equally stiff, the left magnet 4 and the right magnet 5 are the same mass, and the left return path 2 and the right return path 3 are the same mass. Then, the tuning fork will vibrate symmetrically without transmitting substantial forces or torques through center tyne 8 and mounting flange 10. In practice, manufacturing imperfections cause forces and torques to be transmitted through center tyne 8 and mounting flange 10. A dual-axis gyroscope may be formed, as shown in FIG. 10, using a pair of assemblies of FIG. 6B mounted in orthogonal orientations on the same substrate 13. For tuning fork asymmetries as described above, forces and torques will be transmitted from each tuning fork assembly to the common substrate 13. Substrate 13 is mounted to plastic base 55 that is attached to outershield or can 57. The transmitted forces and torques cause center substrate 13, plastic base 55 and can 57 to vibrate at the frequencies of the forces and torques. The amplitude, direction and orientation of the resulting transitional and rotational vibration will depend on the mass, angular moment of inertia and elastic stiffness of the substrate 13, plastic base 55, can 57 and the mounting system for the assembly. Accordingly, the natural resonance of the first tuning fork assembly is designed to be different from the natural resonance of the second tuning fork assembly. For example, the first tuning fork is designed to have a natural resonance at about 1000 Hz and the second tuning fork assembly is designed to have a natural resonance at about 1500 Hz. In this case, the common substrate 13 may vibrate at both at 1000 Hz and 1500 Hz. The resulting vibration of the common substrate 13 would excite sympathetic vibrations of each tuning fork assembly. Vibrations which cause torques to be transmitted from the center substrate 13 through center tyne 8 to each tuning fork will excite differential vibrations of the left and right tynes, which will be sensed by coils 71, 72, 73, 74. This, in turn, will result in error voltage signals on the DIFF signal 606 of FIG. 12. The error voltage signal will be at the frequencies of vibration of the common substrate 13, or at about 1000 Hz and about 1500 Hz. However, the demodulators corresponding to each tuning form assembly operate at the resonant frequency of each tuning fork. For example, the second demodulator operates at 1500 Hz. When the second demodulator demodulates the error voltage signal due to the vibration of the common substrate 13, then the 1000 Hz component of the voltage will mix with the 1500 Hz reference frequency and produce no net DC output shift, but there will be AC components of the error voltage at the sum and difference frequencies. In this case, the demodulator will shift the error signal to a combination of 500 Hz and 2500 Hz as modulation sidebands. Such error signal could result in output noise if passed by low pass filters 612, 617, 618 and 619. Therefore, the difference between the natural resonance frequencies of the two tuning forks should be selected to be large enough to facilitate convenient filtering. In applications requiring mounting of three tuning forks on mutually orthogonal axes in the same package, the difference between the natural resonant frequencies for all three tuning forks should be selected to be large enough to facilitate convenient filtering.

Figure 18:
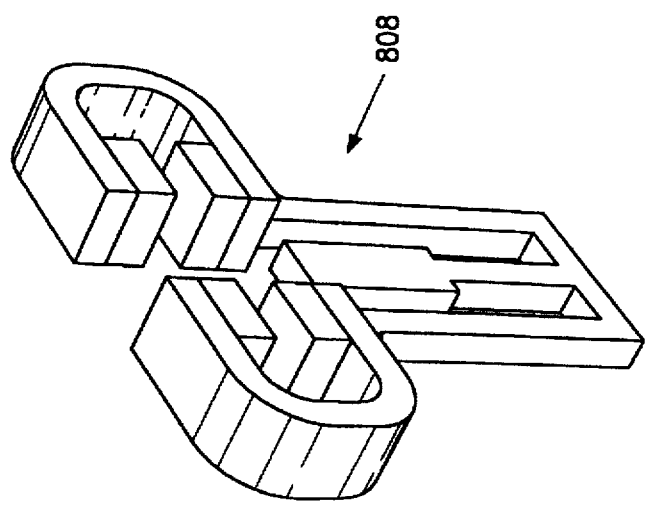
FIG. 18 is a perspective view of the embodiment of FIG. 17.
Figure 17:
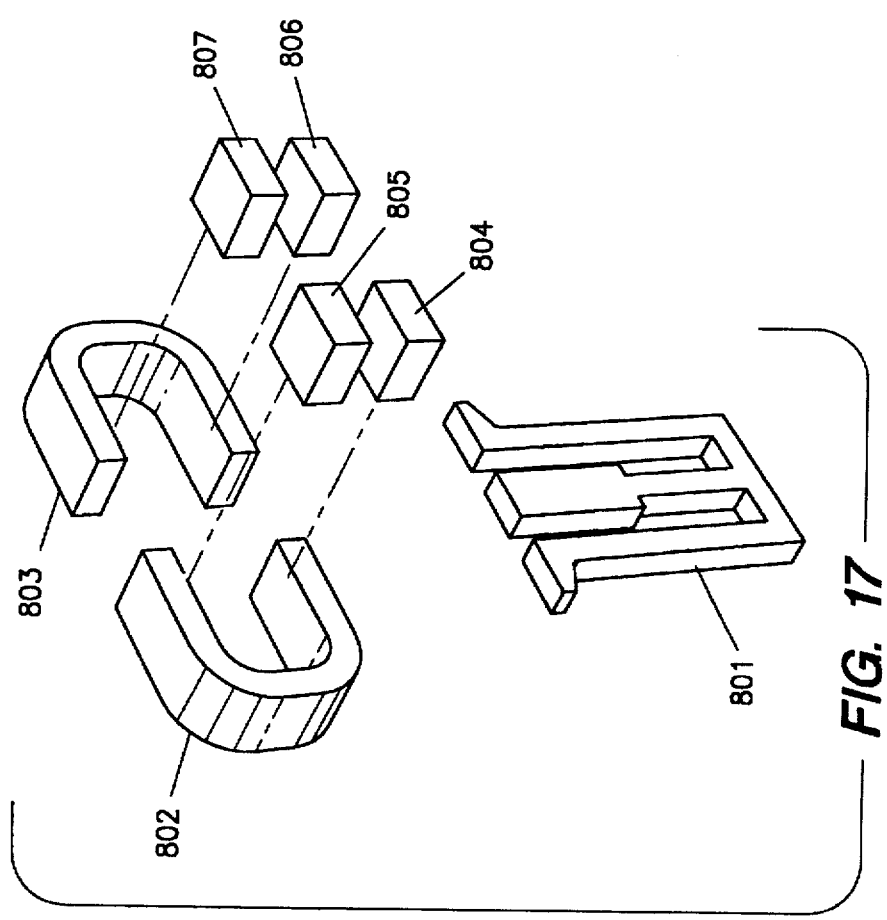
FIG. 17 is an exploded, perspective view of another embodiment of the present invention.

In the alternative embodiment illustrated in FIGS. 17 and 18, the magnetic circuits 802–807 are orientated substantially in the plane of the vibrating fork 801, in manner similar to the embodiment of FIG. 2, with return paths integrally formed of magnetic material (e.g., steel) with the fork, and with the magnets 804–807 positioned on opposite sides of the gap for improved uniformity and density of magnetic flux across the gap. As illustrated in FIGS. 19 and 20, extension plates 809, 810 of substantial mass relative to the vibrating masses of the tynes and associated magnetic circuits are rigidly mounted in spaced and plane-parallel relationship to the vibrating fork 808 via welding or other suitable rigid attachments of the central tyne of the fork 808 to the spaced mating tabs of the mounting plates 809, 810. The two exterior plates therefore form symmetrical massive dampers about the vibrating fork 808, and these plates are then supported on resilient grommets 811, 812 at a plane approximately through the center of mass of the assembly, as shown in FIG. 20.

Figure 21:
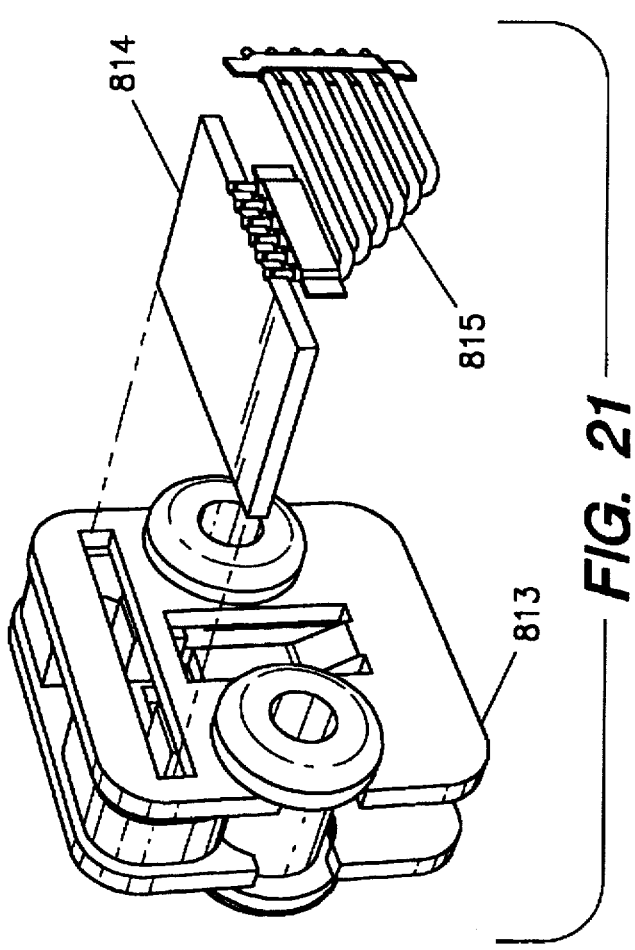
FIG. 21 is an exploded perspective view of the embodiment of FIG. 20.
Figure 22:
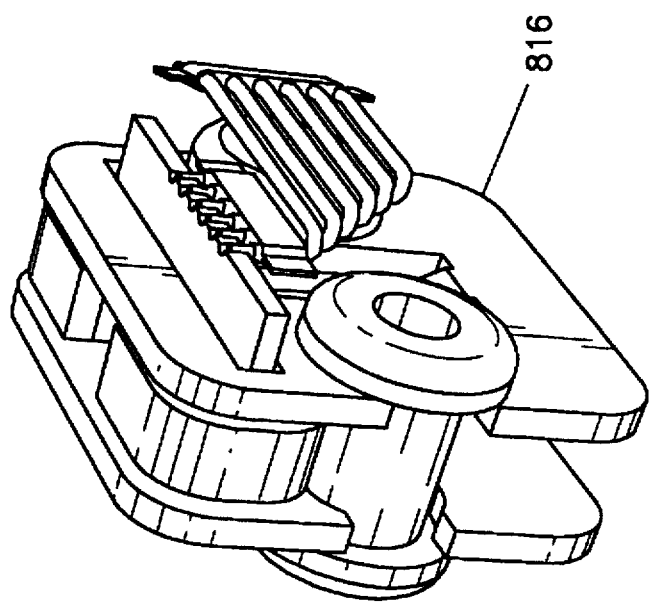
FIG. 22 is a perspective view of the embodiment of FIG. 21.
Figure 23:
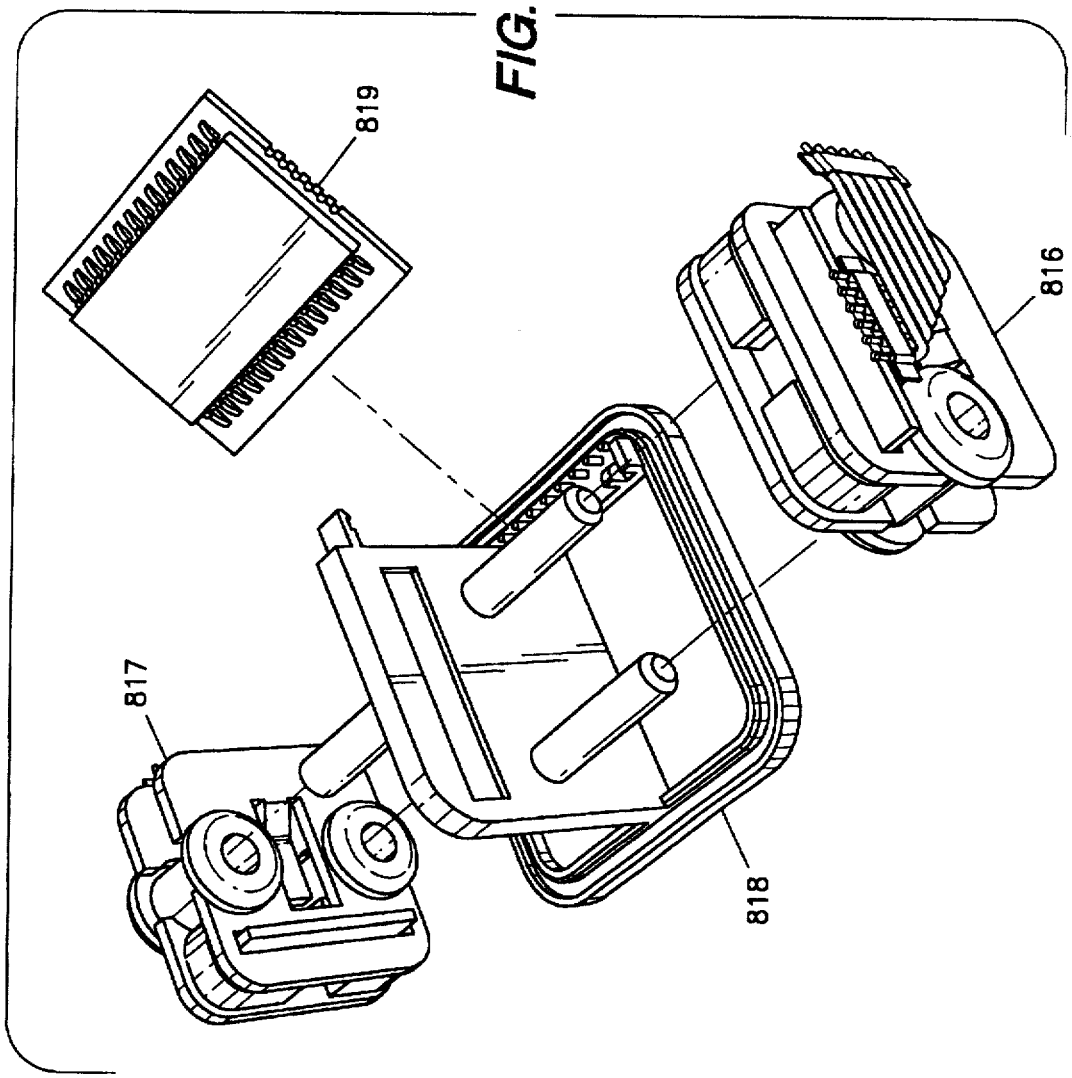
FIG. 23 is an exploded perspective view of a dual-axis assembly of the embodiments of FIG. 22.

As illustrated in FIGS. 21 and 22, a coil assembly 814 configured substantially as previously described with reference to FIGS. 6–8 is fixedly positioned in slots within the exterior plates (that are aligned with the gaps in the vibrating magnetic circuits) in the manner as previously described with reference to FIG. 16. Assemblies of this type may then be packaged together for dual-axis responsiveness by orientating the vibratory forks of a pair of such vibrating gyroscopes 816, 817 in orthogonal orientation on a common mount 818, with connections from the coil assemblies flexibly connected to a contact module 819 that protrudes from the mount 818 for complete packaging within the outer shield or can 821.

In this embodiment, asymmetries in the tynes of the vibrating forks that contribute forces or torques to the center tyne are substantially diminished in coupling such vibrating energy to the massive exterior plates 809, 810. In addition, any diminished level of vibratory energy thus coupled to the exterior plates is only loosely coupled via the resilient grommets 811, 812 to the associated mounting rods of the common mount 818. Finally, the common mount 818 may be formed with high mass to further attenuate vibratory energy that may only be loosely coupled thereto through the resilient grommets 811, 812. Thus, only significantly-reduced levels of vibratory energy may be present in the common mount 818 attributable to one fork for coupling to the other fork (through the loose coupling of resilient grommets and massive exterior plates). Therefore, significantly diminished levels of noise result from cross coupling between gyroscopes packaged in the manner described, as illustrated in FIG. 24.

Therefore, the vibratory gyroscope of the present inspection constitutes a highly repeatable, inexpensive and rugged assembly that provides electrical outputs responsive to movement relative to the plane of vibration of vibrating magnetic circuits carried on the tynes of a vibrating fork. A composite coil assembly disposed to electromagnetically interact with magnetic flux with the gaps of the vibrating magnetic circuits thus provide transducers for driving and sensing steady-state fork vibrations and for sensing dynamic movements of the vibrating fork relative to the plane of steady-state vibrations. Electronic circuitry aids in reducing errors in output indications attributable to manufacturing deviations and mechanical misalignment, and also facilitate final calibration and assembly for operation with minimum components of error in the output indications of dynamic movement thus produced.

I claim:

1. A vibratory gyroscope responsive to movement relative to a plane of vibration comprising:
    a vibratory element including a pair of vibratory tynes disposed symmetrically about a common mounting for vibration within the plane;
    a magnetic circuit including a source of magnetic flux and a magnetic return path mounted on each tyne to form a magnetic gap on each tyne of fixed spacing independent of vibration of the tyne; and
    a coil assembly including electrical conductors disposed in the spacing of the magnetic gap of each tyne for conducting electrical signals indicative of vibratory movement of a tyne relative to the coil assembly associated therewith.

2. A vibratory gyroscope according to claim 1 wherein said coil assembly includes electrical conductors forming a coil disposed in the magnetic gap of one of the tynes for receiving electrical signals to drive vibratory movement of the tynes, and electrical conductors forming a coil disposed in the magnetic gap of the other of the tynes for supplying electrical signals indicative of detected vibratory movement of the tynes, and electrical conductors forming a coil disposed in the magnetic gap of at least said other of the tynes for supplying electrical signals indicative of vibratory movement of the tynes relative to a plane of vibratory movement of the magnetic circuits.

3. The vibratory gyroscope according to claim 2 wherein said coil assembly includes electrical conductors forming a coil disposed in the magnetic gaps of said one and other tynes for supplying electrical signals indicative of vibratory movement of the tynes relative to a plane of vibratory movement of the magnetic circuits.

4. A method of assembling a vibratory gyroscope including a pair of vibrating magnetic circuits each including a source of magnetic flux and an associated magnetic return path positioned to form a magnetic gap on each tyne of fixed spacing independent of vibration of the tyne, and including a coil assembly of electrical conductors disposed within the gap of each magnetic circuit, the method comprising the steps of:
    orienting the magnetic circuits for vibration within a common plane;
    positioning the coil assembly within the spacing of the gap of each magnetic circuit for intercepting magnetic flux in the gap;
    vibrating the magnetic circuits in the common plane while detecting electrical signals on the conductors of the coil assembly;

processing the electrical signals from the coil assembly to provide indication of proper positional alignment of the coil assembly relative to the associated magnetic circuit, with minimum components in the electrical signals representative of physical errors in the assembly of the gyroscope; and fixedly mounting the coil assembly in position within the magnetic gaps of the vibrating magnetic circuits to provide electrical signals indicative of movement relative to the common plane of the vibrating magnetic circuits with minimum electrical signal components representative of physical errors in the assembly of the gyroscope.

5. A method of operating a vibratory gyroscope including a pair of vibrating magnetic circuits each including a source of magnetic flux and an associated magnetic return path positioned to form a magnetic gap on each tyne of fixed spacing independent of vibrator movement, and including a coil assembly of a plurality of sets of electrical conductors disposed within the gap of each magnetic circuit, the method comprising the steps of:

applying electrical signal to a first set of electrical conductors of a coil assembly in a gap of at least one magnetic circuit to excite vibration thereof within a plane of the pair of magnetic circuits;

sensing electrical signal from a second set of electrical conductors of a coil assembly in a gap of another of the pair of magnetic circuits indicative of vibration thereof relative to vibration of said one of the magnetic circuits;

processing the electrical signal from the second set of electrical conductors for controlling electrical signal applied to the first set of electrical conductors;

sensing electrical signals from at least a third set of electrical conductors of the coil assembly in at least the gap in said another of the pair of magnetic circuits indicative of movement of the vibratory magnetic circuits relative to the plane of vibration thereof; and processing the electrical signals from at least the third set of electrical conductors to provide electrical output indicative of movement of the vibratory gyroscope in a direction relative to a plane of the vibratory movement of the magnetic circuits.

6. An electromagnetic transducer assembly for a vibrating gyroscope comprising:

a pair of magnetic circuits, each mounted for vibratory movement within a common plane and each including a source of magnetic flux and a magnetic return path to form a gap on each tyne of fixed spacing independent of vibratory movement;

an assembly including a plurality of sets of electrical conductors positioned to form coils within the gap of each magnetic circuit, a first one of the coils in the spacing of one of the pair of gaps and a second one of the coils in the spacing of another of the pair of gaps each including a pair of substantially flat, spiral-wound segments that are in a plane normal to the spacing of the gap and are displaced along the direction of vibration of the vibrating magnetic circuits about a central region in which the spiral-wound conductors reverse spiraling orientation and are disposed substantially normal to said direction of vibration, a third one of the coils in the spacing of at least said another of the pair of gaps and including a substantially flat, spiral-wound segment in a plane normal to the spacing of the gap and displaced in the direction of vibration of the vibrating magnetic circuits about said central region and are aligned with said direction of vibration, the central regions of the first, second, and third, coils being aligned with the gaps of the associated magnetic circuits for electromagnetic interaction therewith relative to movement of the magnetic circuits with respect to the common plane of vibratory movement.

* * * * *